United States Patent
Lake-Schaal et al.

(10) Patent No.: US 12,324,986 B2
(45) Date of Patent: *Jun. 10, 2025

(54) INTER-VEHICLE ELECTRONIC GAMES

(71) Applicant: WARNER BROS. ENTERTAINMENT INC., Burbank, CA (US)

(72) Inventors: Gary Lake-Schaal, Los Angeles, CA (US); Pamela J. Allison, Burbank, CA (US); Lewis S. Ostrover, Los Angeles, CA (US); Gregory I. Gewickey, Simi Valley, CA (US); Ha Nguyen, Fullerton, CA (US); Prashant Abhyankar, Burbank, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,827

(22) Filed: Feb. 8, 2024

(65) Prior Publication Data

US 2024/0181341 A1    Jun. 6, 2024

Related U.S. Application Data

(63) Continuation of application No. 17/432,799, filed as application No. PCT/US2020/019366 on Feb. 21, 2020, now Pat. No. 11,911,693.

(Continued)

(51) Int. Cl.
*A63F 13/355*    (2014.01)
*A63F 13/79*    (2014.01)
(Continued)

(52) U.S. Cl.
CPC ............ *A63F 13/355* (2014.09); *A63F 13/79* (2014.09); *H04W 4/08* (2013.01); *H04W 4/21* (2018.02); *H04W 4/46* (2018.02)

(58) Field of Classification Search
None
See application file for complete search history.

(56) References Cited

U.S. PATENT DOCUMENTS 6,401,033 B1 *  6/2002  Paulauskas ............ A63F 13/65
                                                                                 701/538
6,868,333 B2    3/2005   Melen
(Continued)

FOREIGN PATENT DOCUMENTS

WO           9851358 A1    11/1998

OTHER PUBLICATIONS

EP 20758662.9 Extended European Search Report, dated Oct. 5, 2017.
PCT/US2020/019366 ISR and Written Opinion, dated Jun. 15, 2020.

*Primary Examiner* — Jason T Yen
(74) *Attorney, Agent, or Firm* — Bookoff McAndrews, PLLC

(57) ABSTRACT

A computer-implemented method for providing electronics games for play by a group of users in two or more moving vehicles. The method includes maintaining data structures of media program data, user profile data and vehicle profile data, receiving user and vehicle state information, identifying a group of users based on contemporaneous presence in two or more vehicles or common participation in a game or other group experience for related trips at different times, and selecting, configuring or creating media program for play at media players. An apparatus or system is configured to perform the method, and related operations.

21 Claims, 16 Drawing Sheets

Related U.S. Application Data

(60) Provisional application No. 62/808,697, filed on Feb. 21, 2019.

(51) Int. Cl.
*H04W 4/08* (2009.01)
*H04W 4/21* (2018.01)
*H04W 4/46* (2018.01)

(56) References Cited

U.S. PATENT DOCUMENTS

| | | |
|---|---|---|
| 10,086,261 B1 | 10/2018 | Kim et al. |
| 10,226,702 B2 | 3/2019 | Hoory et al. |
| 2006/0205510 A1* | 9/2006 | Lauper ............... A63F 13/798 |
| | | 463/41 |
| 2007/0149284 A1* | 6/2007 | Plavetich ............ A63F 13/803 |
| | | 463/37 |
| 2008/0291032 A1* | 11/2008 | Prokhorov ............ B60K 35/10 |
| | | 340/576 |
| 2012/0101724 A1 | 4/2012 | Ranford |
| 2014/0128144 A1* | 5/2014 | Bavitz .................. A63F 9/24 |
| | | 463/23 |
| 2014/0128145 A1 | 5/2014 | Hwang et al. |
| 2014/0128146 A1* | 5/2014 | Story, Jr. ............. A63F 13/00 |
| | | 463/36 |
| 2017/0248433 A1* | 8/2017 | Mahajan ........ G08G 1/096883 |

\* cited by examiner

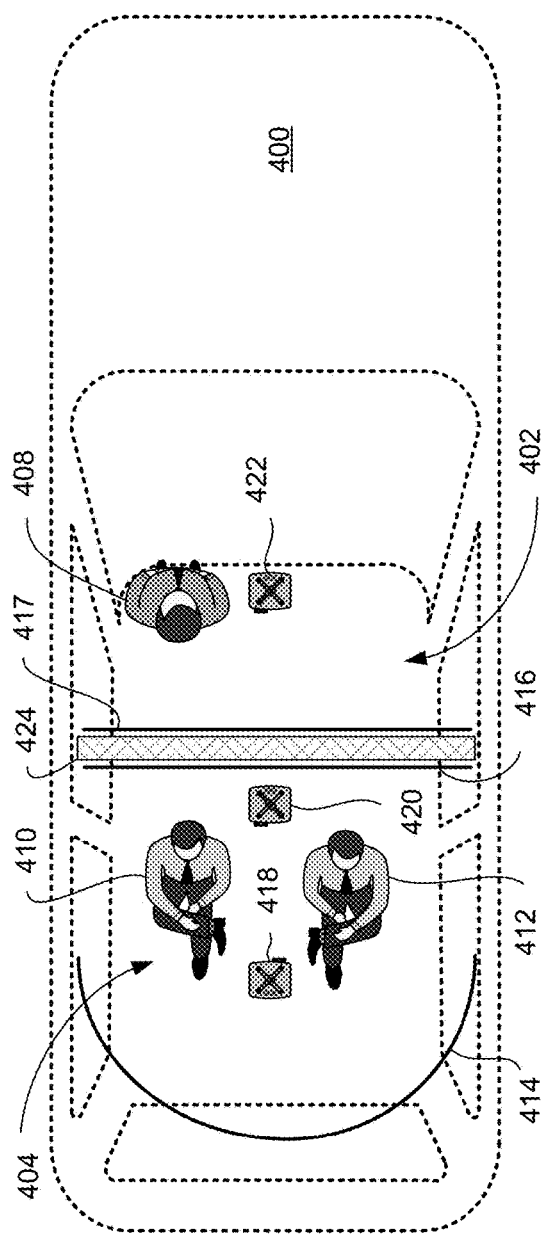
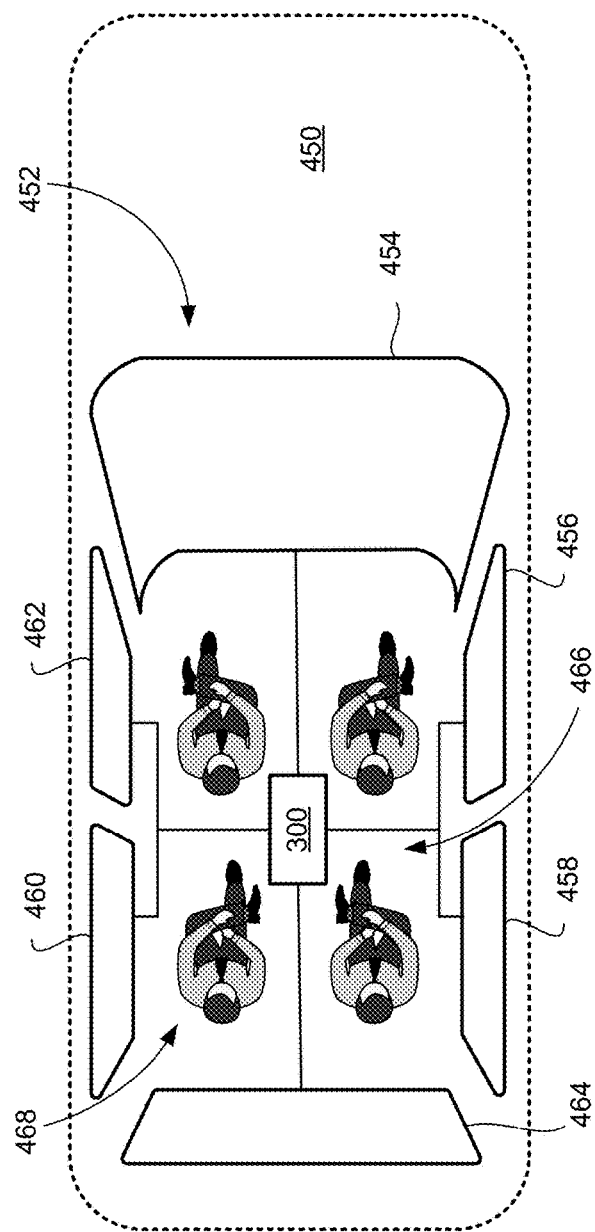

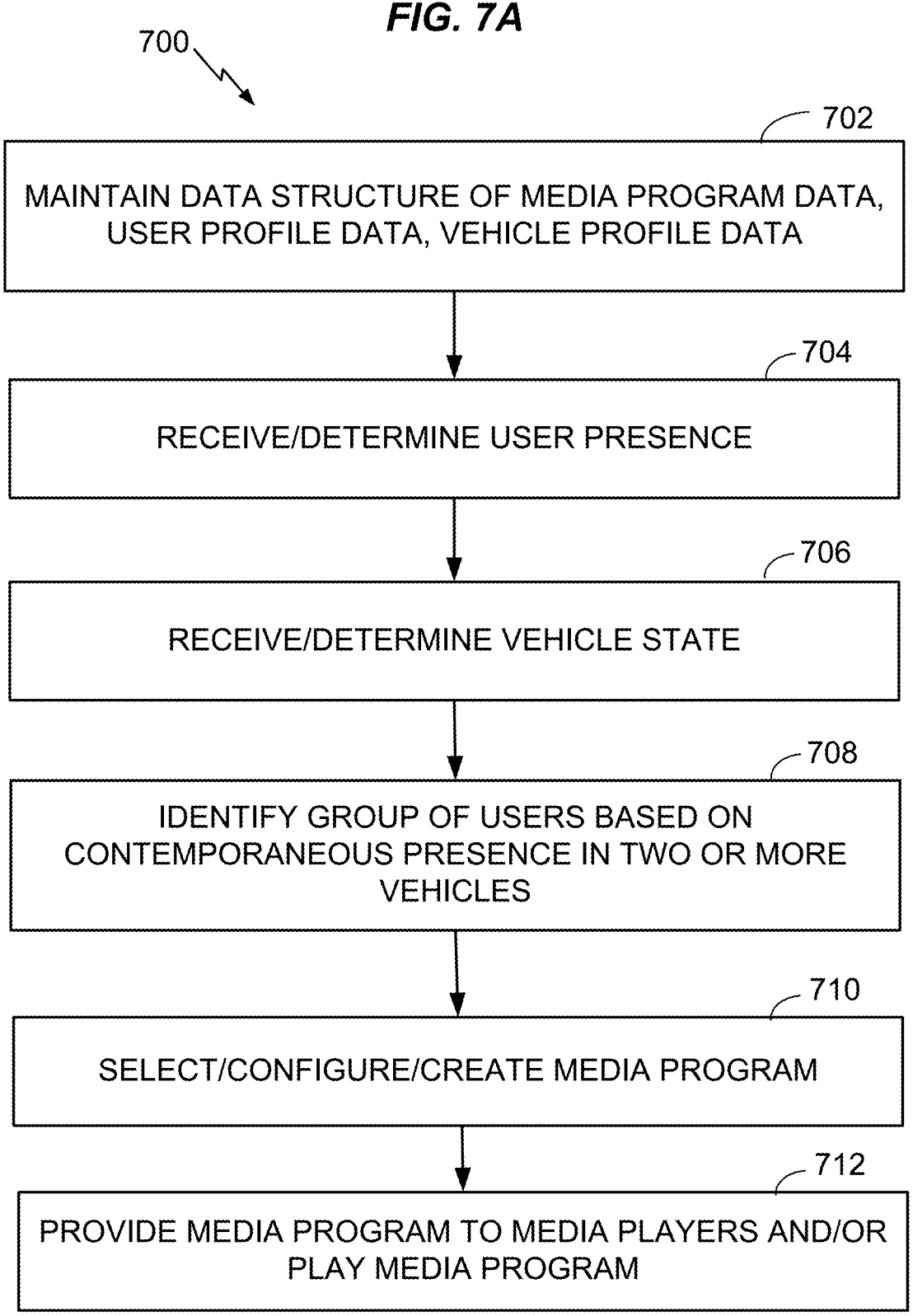

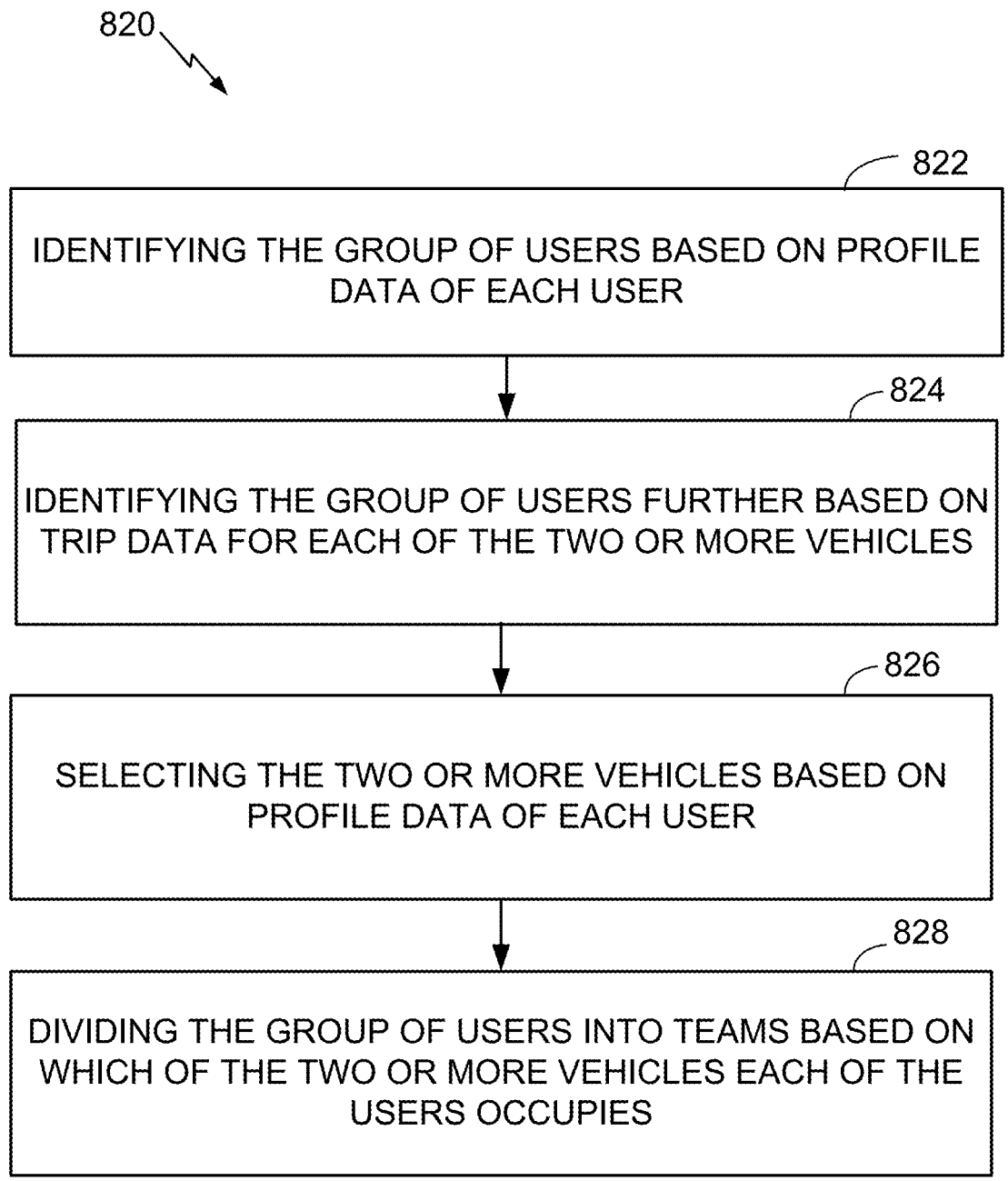

832 — SELECTING/CONFIGURING/CREATING MEDIA PROGRAM INDICATED AS READY FOR PLAY

834 — SELECTING/CONFIGURING/CREATING MEDIA PROGRAM BASED ON USER PROFILE OF EACH USER

836 — SELECTING/CONFIGURING/CREATING MEDIA PROGRAM BASED ON TRIP DATA

838 — SELECTING/CONFIGURING/CREATING MEDIA PROGRAM BASED ON ONE OR MORE CRITERIA, AT LEAST IN PART BY AN ALGORITHM THAT EVALUATES RELATIONSHIPS BETWEEN USER-FACING ELEMENTS OF THE MEDIA PROGRAM AND ONE OR MORE OF: THE INITIAL LOCATION, THE TERMINAL LOCATION AND THE ONE OR MORE INTERMEDIATE LOCATIONS

842 — PROCESSING INVOLUNTARY BIOMETRIC SENSOR DATA INDICATING A TRANSIENT NEUROLOGICAL STATE OF EACH USER RELATING TO EACH USER'S CURRENT OR PAST PREFERENCES

844 — SELECTING/CONFIGURING/CREATING MEDIA PROGRAM BASED ON AT LEAST ONE OF INPUT, PAST PREFERENCE DATA, AND INVOLUNTARY BIOMETRIC SENSOR DATA

852: PROVIDING TRIP DATA FOR EACH OF THE TWO OR MORE VEHICLES FOR USE IN PLAY OF THE MEDIA PROGRAM

854: SELECTING ROUTES OF THE TWO OR MORE VEHICLES BASED IN PART ON CONGESTION MANAGEMENT CRITERIA

856: CONTROLLING NAVIGATION OF AT LEAST ONE OF THE TWO OR MORE VEHICLES TO FACILITATE USE OF THE MEDIA PROGRAM BY THE GROUP OF USERS

858: CONTROLLING THE NAVIGATION INCLUDES PARKING THE TWO OR MORE VEHICLES FOR A STATIONARY SESSION

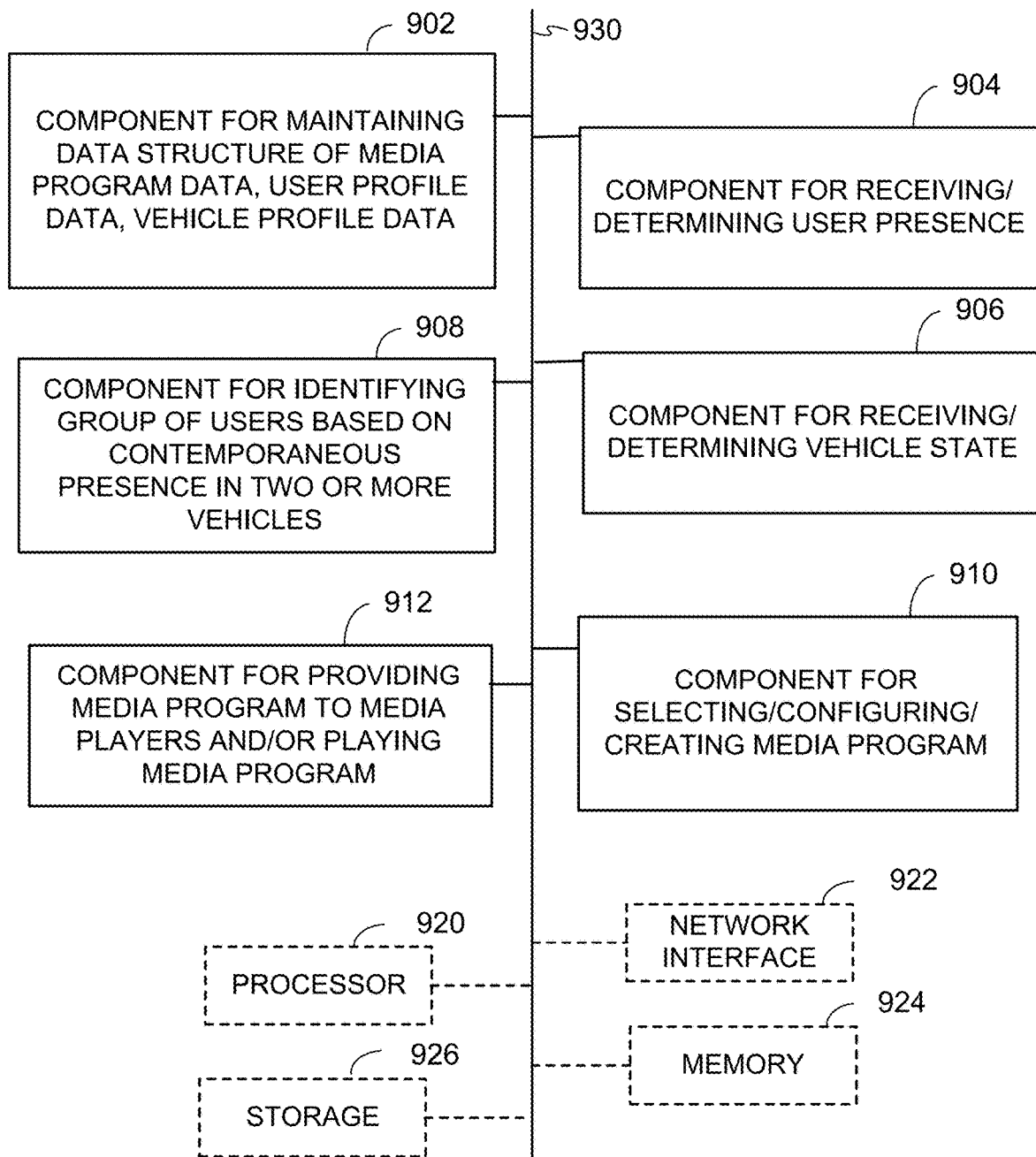

INTER-VEHICLE ELECTRONIC GAMES

PRIORITY CLAIM

This application is a continuation of U.S. application Ser. No. 17/432,799, filed on Feb. 8, 2022, which is a 371 of International Application No. PCT/US2020/019366, filed Feb. 21, 2020, which claims the benefit of priority to U.S. Application No. 62/808,697, filed on Feb. 21, 2019, all of which are incorporated herein their entireties by reference.

FIELD

The present disclosure relates to methods and systems for providing electronic games for play by a group of players in two or more vehicles.

BACKGROUND

Currently, passengers in different vehicles can connect to one another using their mobile phones through their wireless cellular service providers. They can connect to social media networks as well as play games. Most of these games and connections are not changed by the fact that the user is traveling to a destination, beyond allowing the user to report their location and destination if desired. Navigation applications do use vehicle movement and trip information to drive a user interface. Some navigation applications share information reported by other drivers, such as accidents, traffic jams and other travel events. Navigation applications, however, are limited in scope, are designed to avoid distracting the driver and are of limited interest to passengers who are not driving. Some electronic games, for example, Pokémon Go™, include travel information as part of the game, wherein players travel to specified geographic coordinates to collect Pokémon creatures. Games like these show that users are interested in playing electronic games that include travel as an element, but variety and depth are lacking.

Many vehicles today are equipped with network access, via a wireless network, for example a satellite network, a peer-to-peer network, a wireless mesh network, a wireless cellular network, or other wireless network. Passengers in these newer vehicles can enjoy robust network connection to other connected vehicle and to devices in other connected vehicles, connecting through a router/modem in their vehicle or through their cellular or other wireless network. However, current games and applications have not fully realized possibilities for incorporating travel information to entertain and inform passengers.

It would be desirable, therefore, to develop new methods and systems for inter-vehicle games and applications for use by passengers traveling in different vehicles, that overcome these and other limitations of the prior art and deliver more compelling entertainment experiences for the travelers of tomorrow.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method is disclosed for producing electronic games customized for one or more passengers in a moving vehicle to play with one or more passengers in another moving vehicle. Unless otherwise stated, operations of the method are performed by one or more computer processors. As used herein, a "vehicle" is a conveyance for people, for example, an automobile, a bus, a train, an airplane, a ship, an elevator, etc. Vehicles may be connected to a wireless network when driven autonomously or may be driven by a person regardless of wireless connectivity. In an aspect, the vehicle may be coupled to a peer-to-peer network, a mobile mesh network, and/or to a wireless wide area network. As a vehicle travels, one or more control modules or clients within it may connect to controllers or client devices inside one or more other vehicles, either directly or via one or more servers. Using the connection, the controller or other client device may provide travel-related games, for example multi-player games, to the passengers.

In general, drivers are occupied with driving and cannot safely play games while driving, apart from audio-only games. While the technologies described herein can be applied to customize audio content for drivers, in some embodiments, the present application describes multi-player, multi-mode (e.g., audio-video) electronic games for passengers in autonomous or human-driven vehicles who are able to focus their attention elsewhere than the path of travel (e.g., road). Accordingly, as used herein, "passenger" includes all vehicle occupants to the extent their attention will not be diverted by entertainment from safely driving the vehicle, including non-drivers for all forms of entertainment described herein, and drivers primarily for non-distracting entertainment only, including mainly hands-free audio, imagery, olfactory or tactile content presented at times and in modes that will not distract the driver from driving. Significant use cases for the present technology include autonomous vehicles in which all occupants are passengers and no danger of distracting the driver by entertainment content exists. Use cases may also include human-driven vehicles, in which the entertainment content should be presented in a mode that does not distract the driver, for example, on a mobile device or mixed reality headset in use by a non-driver.

The method may include maintaining, at a server, data structures of games and media production data. In an aspect, the games and media production data may include a media content such as audio, video, or audio video work, for example a movie, a television show or series, an advertisement, and the like. As used herein, "media content" includes digital audio, video, audio-video and mixed reality content, and includes interactive and non-interactive media programs or games.

The method may also include maintaining profile information data. In an aspect, profile data may include user profile and vehicle profile. User profile data may include for example: a user's past and present affinities, wherein an "affinity" includes data describing a user preference, general social trends, social trends applying to users or a group of users, demographic attributes of the users of the group, secure identity level, reputation score, membership status in a real or virtual group, or reward status in a system of consumer rewards. Shared affinities for user groups may include, for example, one or more of shared interests in media programs, similarity in demographic profiles, a common destination, or prior social connections.

In an aspect, the user profile data may include the user's current trip information. Trip information may include, for example, a trip origin, destination and places of note along the trip route, trip purpose, vehicle physical location/city, and travel context such as weather (e.g., rain, snow, etc.), road conditions (e.g., constructions, closures, etc.), traffic conditions (e.g., commute or gameday traffic), and the like.

In an aspect, vehicle profile may include trip data, connectivity data, data of devices installed in the vehicle, GPS data, and so on. In various aspects, the user profile and vehicle profile may be combined in a single profile. Various data in the profiles may be used in various combinations.

In an aspect, profile data may include at least one account identifier for each user. Profile data may also include identification of one or more interactive media programs, for example interactive games, indicated as ready for play by one or more electronic accounts identified by account identifiers. As used herein, a "media program" generally involves interactivity with a user via one or more of a user interface (e.g., touchscreen, audio interface, keyboard, inertial sensor, or game controller) or biometric sensors. The degree of interactivity may vary. Minimal interactivity consists of predetermined content that does not change in response to user input. Such minimally interactive content is herein referred to as non-interactive. In contrast, an interactive media program responds to user input or biometric feedback by altering the content prior to outputting to a medium. For example, game play or story progress changes depending on user input. As used herein, an interactive media program may be referred to as an interactive game, or in brief as a game. Other forms of interactive media programs may include, for example, branching narratives and applications that facilitate social interaction. The present application is directed primarily to interactive media content, by may also be used for non-interactive content. For example, a group of friends riding in different vehicles may choose to consume non-interactive content together as a shared experience.

The method may include identifying a group of users so that each user may participate in inter-vehicle games in a communication network-mediated interaction with another user of the group during a contemporaneous presence in different vehicles, or in an alternative, in relation to asynchronous presences in vehicles that relate to trip-related factors, a common user interest in participating in a multi-user experience or game. The group of users may be identified based on a contemporaneous presence by each user in the group in two or more vehicles. In an aspect, the group may also be identified by an indication of interest by each user, for example, based at least in part on the profile data of each user. In another aspect, the group may be identified based on trip information or data in the profile data. In an aspect, the method may identify the group based on trip data for the each of the vehicles.

In an aspect, although a group of users may be identified based on past, present and/or future co-presence, game play may relate to, or may depend on, the contemporaneous presence of the users in the separate vehicles. In addition, or in an alternative, game play may relate to trip-related factor without requiring contemporaneous player presence in vehicles. For example, players taking the same trip or similar strips at different times may compete for a top score, and/or influence game play that accumulates group input and evolves over time.

The method may further include selecting or configuring an interactive media program for play by each user of the group. In an aspect, the method may include selecting or configuring a non-interactive media program for play. A non-interactive program may provide the ability for crowdsourcing; for example, a group of users may participate in the selection and configuration of media programs for other users.

In an aspect, the method may include selecting or configuring interactive media programs based at least in part on whether the programs are indicated as ready for play. In some applications, a crowdsourcing algorithm determines the ready indication of a program.

In an aspect, the method may further include selecting the two or more vehicles based in part on the profile data.

In the aspect where the group of users is identified by trip data for each of the vehicles, the method may include selecting or configuring an interactive media program for play based at least in part on the trip data. In a related aspect, the method may further include selecting or configuring the interactive media based at least in part on user profiles. For example, trip data may define one or more criteria selected from the group consisting of: a duration for an interactive media session for play by the group of users in the vehicles, an initial location at which the method may schedule initiation of the session, a terminal location at which the method may schedule termination of the session, and one or more intermediate locations along a route for one or more of the vehicles defined by a navigational component. Based on one or more of these criteria, the method may employ at least in part an algorithm that evaluates relationships between user-facing elements of the program and one or more of: the initial location, the terminal location, and the one or more intermediate locations.

In an aspect, for the selection or configuration of the interactive media programs, the method may include serving a user interface to the interactive media players in each of the vehicles, thereby enabling the passengers to provide intentional user input to the selecting and configuring.

The method may further provide the interactive media program configured for output to interactive media players, including at least one of the interactive media players in each of the vehicles during the contemporaneous presence of the identified users. In an aspect, the contemporaneous presence may begin before, during, or after the network provides the media program to the connected vehicles. As used herein, "connected vehicle" refers to any one of two or more vehicles controlled by, or containing, a processor in communication with a media player and with a corresponding processor in another of the connected vehicles. After a processor provides the media program, the media players in each of the connected vehicles then execute or play the program in the vehicles which are enabled for interaction with each user during the contemporaneous presence. In an aspect, when the program is provided in augmented reality or mixed reality, output of the media program may be displayed on a window of the vehicles.

In an aspect, the media player may be a mobile device identified as belonging to one or more different users of the group of users. The mobile device may include a mobile phone, a wearable device, an xR player, a laptop, a tablet, or other portable computing device.

In an aspect, the method may include processing biometric sensor data indicating a transient neurological state of a user, which may be an involuntary (unintentional) state or may be an intentional signal. In an aspect, the biometric sensor data may relate to each user's current or past preferences. For example, the method may process biometric sensor data for identifying users in the group, and/or for the selection or configuration of the interactive media programs.

In an aspect, the method may include a combination of the above factors for the selection or configuration of the interactive media programs. A combination may include, for example, user intentional input, past preference data, and biometric sensor data.

In an aspect, the method may include defining, by one or more processors, routes for the vehicles based at least in part on the selected or configured interactive media program. In an aspect, the method may include selecting routes of the vehicles based in part on congestion management criteria. In an aspect, the method may include controlling navigation of the vehicles to facilitate use of the interactive media program by the group of users. In some applications, controlling navigation may include parking the vehicles for a stationary session, for example, e.g., a conference or a tailgate party. In some embodiments, users may compete to identify superior routes based on different criteria, for example, shortest time, easiest driving, most scenic, and so forth; in such games, the method may include tracking different route criteria over routes by different users at different times.

In an aspect, the method may include sending an invitation to the identified users to enter the selected vehicles. An invitation may include, for example, text messages, emails, phone calls, etc. In an aspect, the method may include configuring messages for the inviting based on optimizing matches in preferences of the group of users from a pool of potential users by an algorithm based on one or more of: an aggregate measure of preference criteria weighted by defined weighting factors and a predictive machine learning algorithm trained over a set of preference criteria with an objective of maximizing a measure of user satisfaction with inclusion in the group of users. In an aspect, in response to intentional input from one or more of the group of users indicating an intention for applying less exclusive criteria, the method may loosen the preference criteria.

In an aspect, the selected or configured interactive media program may be a game. In this aspect, the method may include dividing a group of users into teams based on which of the two or more vehicles each of the users occupies during the contemporaneous presence. In an aspect, a team may include group of users in multiple vehicles. When a team include users in multiple vehicles, the method may include providing trip data for each of the vehicles for use in play of the game.

In an aspect, the method may further include tracking at least one of game progress or game rewards earned by each user during the contemporaneous presence and communicating the game progress or game rewards to a server for use after termination of the continuous presence. In an alternative, the method may include tracking at least one of game progress or game rewards earned by each user during asynchronous presence in vehicles in relation to a game or other interactive experience involving each user.

In an aspect, the method may include determining at least one winner of the game based on at least one of: which of the vehicles scores highest in one or more predetermined trip-related criteria, which of the group of users most accurately predicts occurrence of one or more trip-related events, which of the group of users scores highest in answering trip-related trivia questions. Other determining criteria are also contemplated. In an aspect, the predetermined trip-related criteria may include, for example, travel time, travel distance, least lane changes, least stops, hitting least potholes, etc. Trip-related events may include, for example, passing a waypoint or landmark. A trip-related game may be managed for users traveling at the same time, or at different times. For example, the method may include determining a "current leader" for an open-ended game of "locating the storm drains in Los Angeles" or "naming verifiable public events that have occurred along a route," wherein game play is indefinite. In such cases, the winner that is determined enjoys winning status only for so long as no one else bests the score.

In an aspect, the method may include reporting to the group of users about progress of the vehicles. Progress may include, for example, information regarding delays or anything else of likely interest, e.g., estimated arrival time, passing locations of interest, and other events. The reporting may include text messages, alerts, calls, or other communication media. In a game between contemporaneous players, the reporting of vehicle progress may be in real time. In asynchronous games, vehicle progress may be reported on an online game board or by electronic messaging to participants at period intervals, or in response to events.

In an aspect, the method may further include recording the group of users for sharing over a computer network. For example, the method may share the recording on social media or inserting it into a video feed of a live event (e.g., showing fans excited to be coming to or leaving an event).

As stated, the method may select or configure non-interactive media programs. In this aspect, the non-interactive media programs can be executed or played on non-interactive media players, or in non-interactive mode of interactive media players. Various aspects of the present disclosure discussed above may also be applicable for non-interactive media programs.

In an aspect, the method may select non-interactive media programs to define a playlist for play during, or for a period after, the contemporaneous presence. The method may further include selecting non-interactive media programs based on one or more trip-related events involving the at least one of the two or more vehicles, which may be progressing contemporaneously or asynchronously.

In some embodiments, the method may include selecting a defined playlist for play during a trip by a first user based on one or more prior trips by the first user, or by one or more different users. For example, the method may include selecting a playlist based on song title or lyric 'clues' from a playlist for the same route or similar routes previously taken by a different user. Thus, users may share route-specific playlists with one another, or develop the playlists as a group. In a related aspect, the method may include receiving a signal from at least one of the group of users indicating a request to share one or more media programs with another user during a future trip and enabling fulfillment of the request for another user.

The methods described herein provide an automated process for providing electronic games customized for one or more passengers in a moving vehicle to play with one or more passengers in another moving vehicle. Applications for the methods may include, for example, providing interactive games for play by a group of users in two or more moving vehicles. The group of users are passengers (which may include drivers) in either driverless vehicles or vehicles driven by a human. The games and the vehicles may be selected based on, and have themes based on, the users' profiles and trip and/or route information. The users can play to win prizes or share game credits. In some applications, the users may be geographically local to one another. In other applications, the users may be geographically distant from one another. When the users are distant from one another, and the game has xR features, the methods may provide physical views of some users to other distant users. In some applications, the methods may include producing non-interactive games for play by a group of users in two or more moving vehicles.

The foregoing methods may be implemented in any suitable programmable computing apparatus, by provided program instructions in a non-transitory computer-readable medium that, when executed by a computer processor, cause the apparatus to perform the described operations. The processor may be local to the apparatus and user, located remotely, or may include a combination of local and remote processors. An apparatus may include a computer or set of connected computers that is used in audio video production or for output of audio video content to one or more users. An audio video output device may include, for example, a personal computer, mobile phone, notepad computer, mixed reality device, virtual reality device, augmented reality device, or special-purpose hardware for vehicles. Special-purpose hardware for vehicles may include, for example, window glass equipped with one or more LCD layers for augmented reality or conventional display, projectors with projection screens incorporated into the vehicle interior; seats equipped with motion-simulating and/or motion-damping systems; vehicle audio systems; and active vehicle suspensions. Other elements of the apparatus may include, for example, an audio output device and a user input device, which participate in the execution of the method. An apparatus may include a virtual, augmented, or mixed reality device, such as a headset or other display that reacts to movements of a user's head and other body parts. The apparatus may include biometric sensors that provide data used by the method.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 4A is a schematic diagram showing features of a human-piloted vehicle equipped for passenger entertainment.

FIG. 4B is a schematic diagram showing features of an autonomous vehicle equipped to passenger entertainment.

FIG. 7A is a flow diagram illustrating a process for providing media programs for play by a group of users in two or more moving vehicles.

FIGS. 8A to 8F are flow diagrams illustrating further operations or aspects of the process for providing media programs for play by a group of users in two or more vehicles.

FIG. 9 is a conceptual block diagram illustrating components of an apparatus or system for the method as shown in FIG. 7A.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
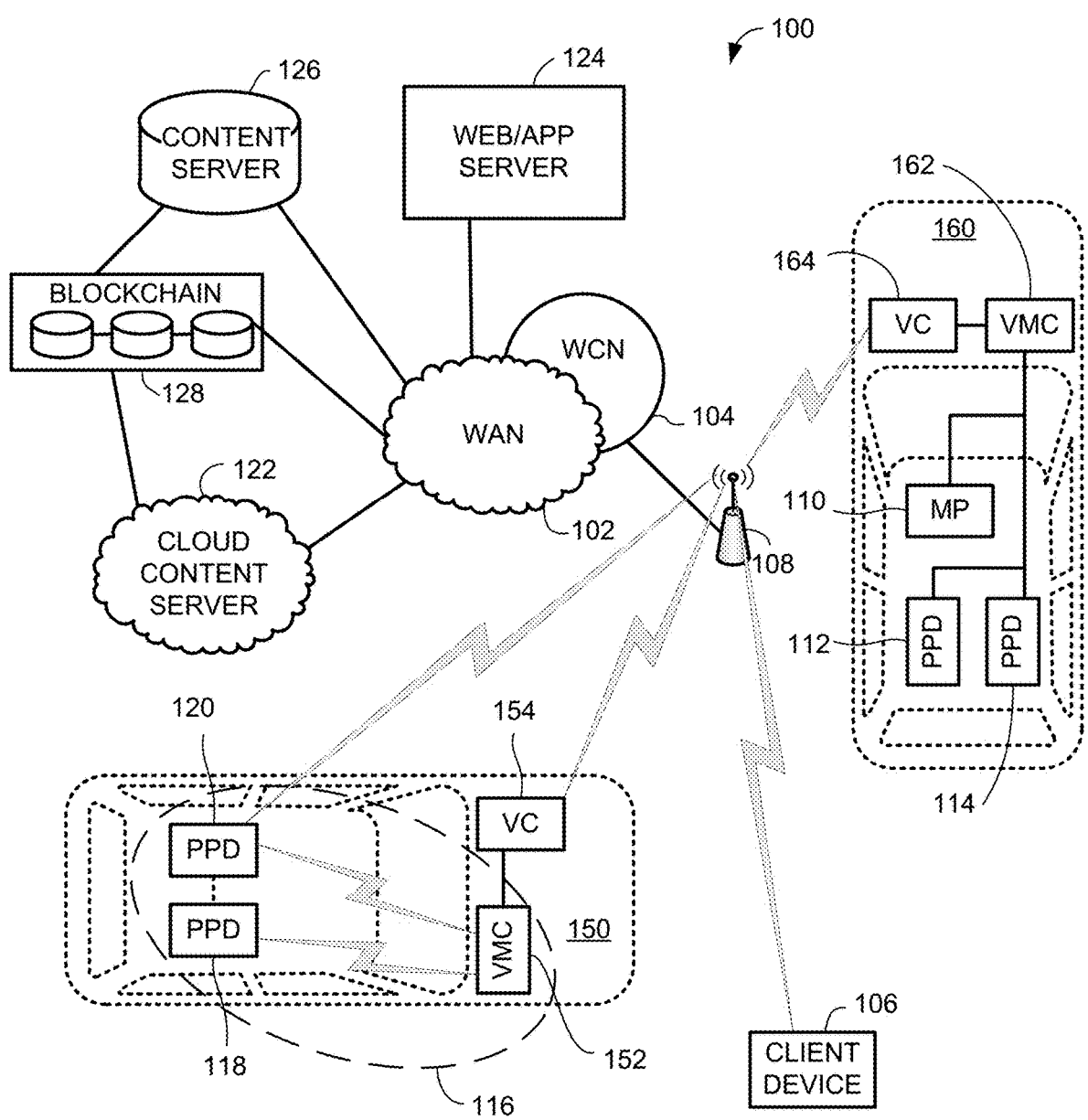
FIG. 1 is a schematic block diagram illustrating aspects of a system and apparatus for providing media programs for play by a group of users in two or more moving vehicles.

Referring to FIG. 1, methods for providing electronics games for play by a group of users in two or more moving vehicles 150, 160 may be implemented in a network 100. Other architectures may also be suitable. In a network architecture, sensor data can be collected and processed locally, and used to control streaming data from a network source. In alternative aspects, audio-video content may be controlled locally, and log data provided to a remote server. The audio-video content, also referred to as media content, includes digital audio, video, audio-video and mixed reality content, and includes interactive and non-interactive media programs or games. The media content may also be configured to support interactive features resembling video game features or may be devoid of interactive features except for responding to data indicative of user's location, preferences, biometric states or affinities.

A suitable network environment 100 for practice of the methods summarized herein may include various computer servers and other network entities in communication with one another and with one or more networks, for example a Wide Area Network (WAN) 102 (e.g., the Internet) and/or a wireless communication network (WCN) 104, for example a cellular telephone network using any suitable high-bandwidth wireless technology or protocol, including, for example, cellular telephone technologies such as 3rd Generation Partnership Project (3GPP), Long Term Evolution (LTE), 5G fifth-generation cellular wireless, Global System for Mobile communications (GSM) or Universal Mobile Telecommunications System (UMTS), and/or a wireless local area network (WLAN) technology using a protocol such as Institute of Electrical and Electronics Engineers (IEEE) 802.11, and equivalents thereof. In an aspect, for example as in a mesh network, the servers and other network entities (collectively referred to as "nodes") connect directly, dynamically and non-hierarchically to as many other nodes as possible and cooperate with one another to efficiently route data from/to client devices. This lack of dependency on one node allows for every node to participate in the relay of information. Mesh networks can dynamically self-organize and self-configure. In another aspect, the servers can connect to client devices in a server-client structure. In an aspect, some client devices can also act as servers.

Client devices may include, for example, portable passenger devices (PPDs) such as smartphones, smartwatches, notepad computers, laptop computers, and mixed reality headsets, and special purpose media players and servers, herein called vehicle media controllers (VMCs) installed as part of vehicular electronic systems. VMCs 152, 162 may be coupled to vehicle controllers (VCs) 154, 164 as a component of a vehicular control system. The VC may control various other functions with corresponding components, for example, engine control, interior climate control, anti-lock braking, navigation, or other functions, and may help coordinate media output of the VMC to other vehicular functions, especially navigation.

Computer servers may be implemented in various architectures. For example, the environment 100 may include one or more Web/application servers 124 containing documents and application code compatible with World Wide Web protocols, including but not limited to HTML, XML, PHP and Javascript documents or executable scripts, for example. The environment 100 may include one or more content servers 126 for holding data, for example video, audio-video, audio, and graphical content components of media content, e.g., media programs or games, for consumption using a client device, software for execution on or in conjunction with client devices, and data collected from users or client devices. Data collected from client devices or users may include, for example, sensor data and application data. Sensor data may be collected by a background (not user-facing) application operating on the client device, and transmitted to a data sink, for example, a cloud-based content server 122 or discrete content server 126. Application data means application state data, including but not limited to records of user interactions with an application or other application inputs, outputs or internal states. Applications may include software for selection, delivery or control of media content and supporting functions. Applications and data may be served from other types of servers, for example, any server accessing a distributed blockchain data structure 128, or a peer-to-peer (P2P) server 116 such as may be provided by a set of client devices 118, 120, 152 operating contemporaneously as micro-servers or clients.

In an aspect, information held by one or more of the content server 126, cloud-based content server 122, distributed blockchain data structure 128, or a peer-to-peer (P2P) server 116 may include, for example, a data structure of media production data in an ordered arrangement of media components for route-configured media content, a game engine including components for configuring and rendering interactive content in response to user input, or a library of media segments.

As used herein, users (who can also be passengers) are consumers of media content. When actively participating in content via an avatar or other agency, users may also be referred to herein as player actors. Consumers are not always users. For example, a bystander may be a passive viewer who does not interact with the content or influence selection of content by a client device or server.

The network environment 100 may include various passenger portable devices (PPDs), for example a mobile smartphone client 106 of a user who has not yet entered either of the vehicles 150, 160. Other client devices may include, for example, a notepad client, or a portable computer client device, a mixed reality (e.g., virtual reality or augmented reality) client device, or the VMCs 152, 162. PPDs may connect to one or more networks. For example, the PPDs 112, 114, in the vehicle 160 may connect to servers via a vehicle controller 164, a wireless access point 108, the wireless communications network 104 and the WAN 102, in which the VC 164 acts as a router/modem combination or a mobile wireless access point (WAP). For further example, in a mobile mesh network 116, PPD nodes 118, 120, 152 may include small radio transmitters that function as a wireless router. The nodes 118, 120, 152 may use the common WiFi standards to communicate wirelessly with client devices, and with each other.

Figure 2:
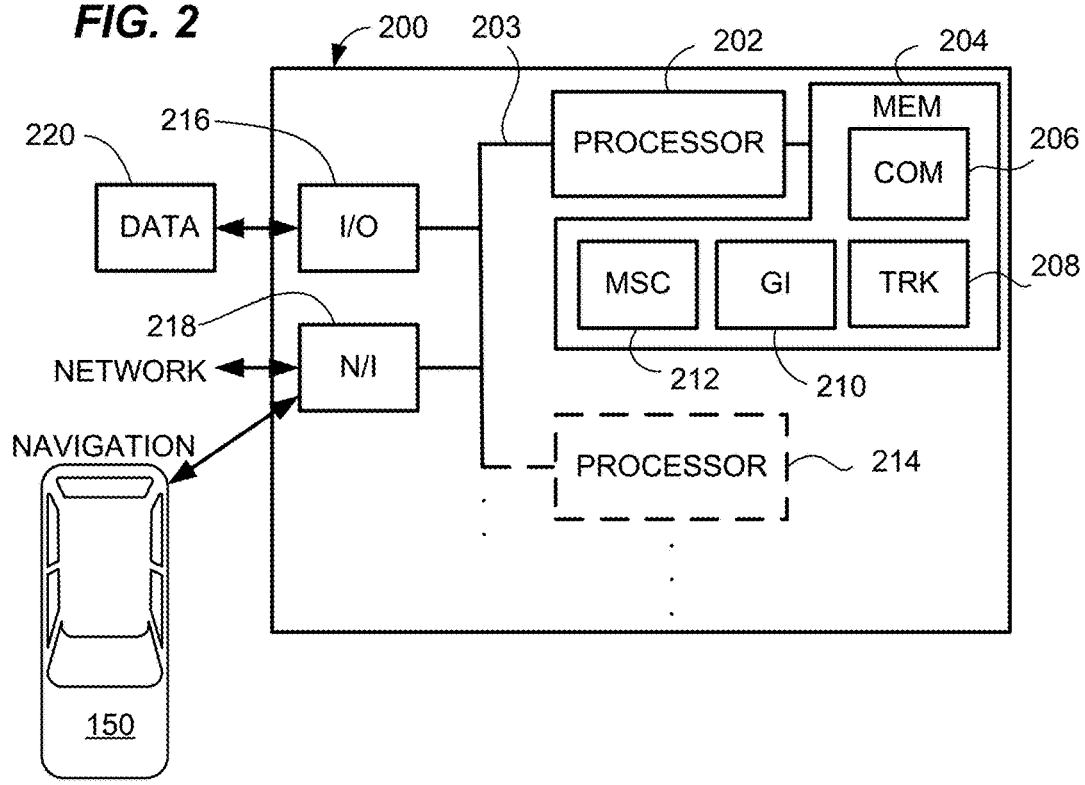
FIG. 2 is a schematic block diagram illustrating aspects of a server for delivering media programs.

FIG. 2 shows a media content server 200 for controlling output of digital media content, which may operate in the environment 100, for example as an VMC 152, 162 or content server 122, 126, 128. The server 200 may include one or more hardware processors 202, 214 (two of one or more shown). Hardware may include firmware. Each of the one or more processors 202, 214 may be coupled to an input/output port 216 (for example, a Universal Serial Bus port or other serial or parallel port) to a source 220 for sensor data indicative of vehicle or travel conditions. Suitable sources may include, for example, Global Positioning System (GPS) or other geolocation sensors, one or more cameras configuring for capturing road conditions and/or passenger configurations in the interior of the vehicle 150, one or more microphones for detecting exterior sound and interior sound, one or more temperature sensors for detecting interior and exterior temperatures, door sensors for detecting when doors are open or closed, and any other sensor useful for detecting a travel event or state of a passenger. Some types of servers, e.g., cloud servers, server farms, or P2P servers, may include multiple instances of discrete servers 200 that cooperate to perform functions of a single server.

The server 200 may include a network interface 218 for sending and receiving applications and data, including but not limited to sensor and application data used for controlling media content as described herein. The content may be served from the server 200 to a client device or stored locally by the client device. If stored local to the client device, the client and server 200 may cooperate to handle sensor data and other player actor functions. In some embodiments, the client device may handle all content control functions and the server 200 may be used for tracking only or may not perform any critical function of the methods herein. In other aspects, the server 200 performs content control functions.

Each processor 202, 214 of the server 200 may be operatively coupled to at least one memory 204 holding functional modules 206, 208, 210, 212 of an application or applications for performing a method as described herein. The modules may include, for example, a communication module 206 for communicating with client devices and servers. The communication module 206 may include instructions that when executed by the processor 202 and/or 214 cause the server to communicate control data, content data, and sensor data with a client device via a network or other connection. A tracking module 208 may include functions for tracking travel events using sensor data from the source(s) 220 and/or navigation and vehicle data received through the network interface 218 or other coupling to a vehicle controller. In some embodiments, the tracking module 208 or another module not shown may track emotional responses and other interactive data for one or more passengers, subject to user permissions and privacy settings.

The modules may further include a group integration (GI) module 210 that, when executed by the processor, causes the server to perform any one or more of identifying a group of users based on at least one of a contemporaneous presence by each user in the group in two or more vehicles (or anticipated future contemporaneous presence) or an application-mediated commonality between asynchronous trips, and an indication of interest by the each user in a communication network-mediated interaction with another of the group of users during the contemporaneous presence or by different users regarding asynchronous trips. For example, the GI module 210 may determine input parameters including a trip destination for one or more passengers, current road conditions, and estimated remaining travel duration based on data from the tracking module 208, and apply a rules-based algorithm, a heuristic machine learning algorithm (e.g., a deep neural network) or both, to create one or more media content identifiers consistent with the input parameters. The GI module 201 may also determine associations of media content with one or more parameters indicating user-perceivable characteristics of the media content, including at least an indicator of semantic meaning relevant to one or more travel events. The GI module 210 may perform other or more detailed operations for integrating trip information in media content selection as described in more detail herein below.

The modules may include, for example, a media selection and configuration process (MSC) module 212. The MSC module 212 may include instructions that, when executed by the processor 202 and/or 214, cause the server 200 to select and configure media content for output by a player device during the trip based on criteria as described in more detail herein below. The memory 204 may contain additional instructions, for example an operating system, and supporting modules.

Figure 3:
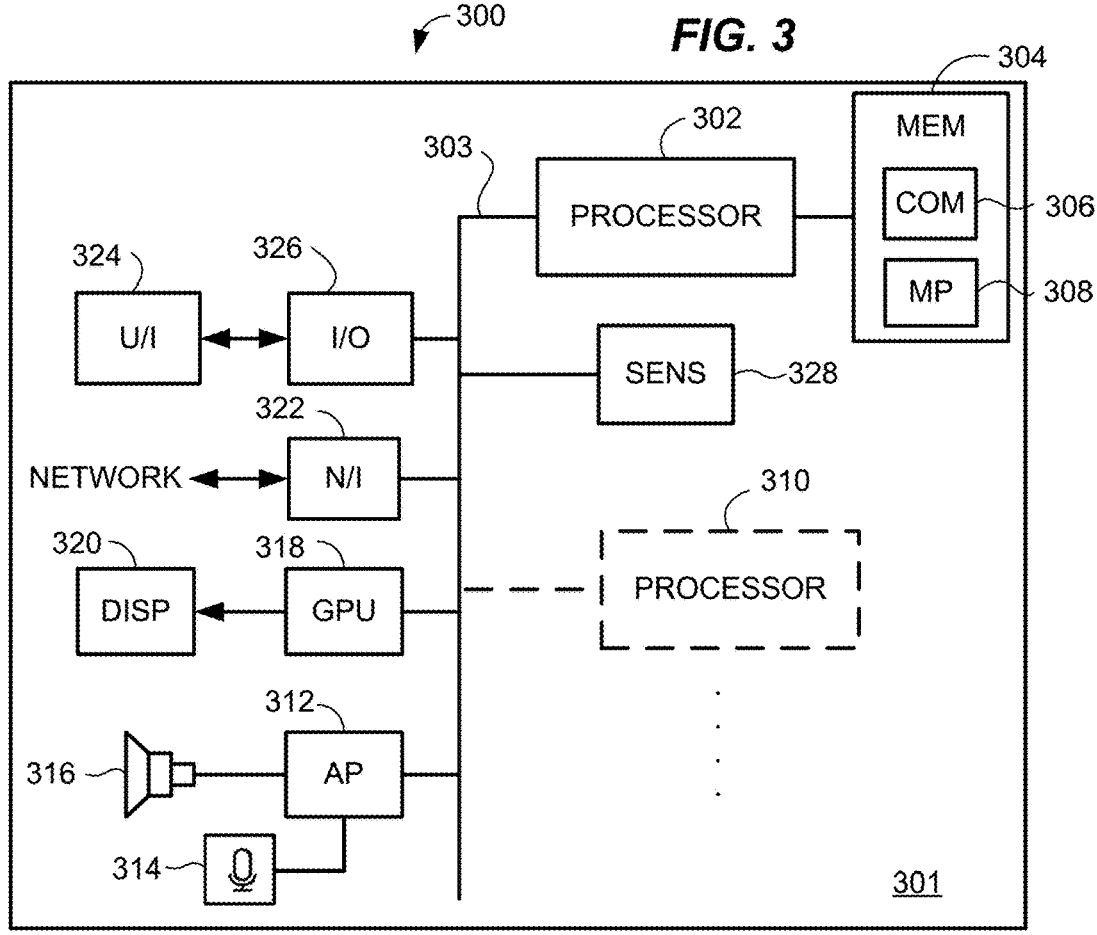
FIG. 3 is a schematic block diagram illustrating aspects of a client device for playing of media programs.

FIG. 3 shows aspects of a content player device 300 for operating on and controlling output of digital media content. In some embodiments, the same computing device (e.g., device 300) may operate both as a content player device and as a content configuration server, for example, as a node of a mesh network. In such embodiments, the computing device may also include functional modules and interface devices as described above for the server 200.

For content playing, the apparatus 300 may include a processor 302, for example a central processing unit, a system-on-a-chip, or any other suitable microprocessor. The processor 302 may be communicatively coupled to auxiliary devices or modules of the apparatus 300, using a bus or other coupling. Optionally, the processor 302 and its coupled auxiliary devices or modules may be housed within or coupled to a housing 301, for example, a housing having a form factor of a television, active window screen, projector, smartphone, portable computing device, wearable goggles, glasses, visor, or other form factor.

A user interface device 324 may be coupled to the processor 302 for providing user control input to a process for converting input to game commands and for controlling output of digital media content. The process may include outputting video and audio for a conventional display screen or projection display device. In some aspects, the media control process may include outputting audio-video data for an immersive mixed reality content display process operated by a mixed reality immersive display engine executing on the processor 302. In some aspects, the process may include outputting haptic control data for a haptic glove, vest, or other wearable; motion simulation control data, or control data for an olfactory output device such as an Olorama™ or Sensoryco™ scent generator or equivalent device.

User control input may include, for example, selections from a graphical user interface or other input (e.g., textual or directional commands) generated via a touch screen, keyboard, pointing device (e.g., game controller), microphone, motion sensor, camera, or some combination of these or other input devices represented by block 324. Such user interface device 324 may be coupled to the processor 302 via an input/output port 326, for example, a Universal Serial Bus (USB) or equivalent port. Control input may also be provided via a sensor 328 coupled to the processor 302. A sensor may comprise, for example, a motion sensor (e.g., an accelerometer), a position sensor, a camera or camera array (e.g., stereoscopic array), a biometric temperature or pulse sensor, a touch (pressure) sensor, an altimeter, a location sensor (for example, a Global Positioning System (GPS) receiver and controller), a proximity sensor, a motion sensor, a carbon dioxide sensor, a smoke or vapor detector, a gyroscopic position sensor, a radio receiver, a multi-camera tracking sensor/controller, an eye-tracking sensor, a microphone or a microphone array. The sensor or sensors 328 may detect biometric data used as an indicator of the user's emotional state, for example, facial expression, skin temperature, pupil dilation, respiration rate, muscle tension, nervous system activity, or pulse. In addition, the sensor(s) 328 may detect a user's context, for example an identity, position, size, orientation, and movement of the user or the user's physical environment and of objects in the environment, or motion or other state of a user interface display, for example, motion of a virtual-reality headset. The sensor or sensors 328 may generate orientation data for indicating an orientation of the apparatus 300 or a passenger using the apparatus. For example, the sensors 328 may include a camera or image sensor positioned to detect an orientation of one or more of the user's eyes, or to capture video images of the user or the user's physical environment, or both. In some embodiments, a camera, image sensor, or other sensor configured to detect a user's eyes or eye movements may be integrated into the apparatus 300 or into ancillary equipment coupled to the apparatus 300. The one or more sensors 328 may further include, for example, an interferometer positioned in the support structure 301 or coupled ancillary equipment and configured to indicate a surface contour to the user's eyes. The one or more sensors 328 may further include, for example, a microphone, array or microphones, or other audio input transducer for detecting spoken user commands or verbal and non-verbal audible reactions to output of the media content.

The apparatus 300 or a connected server may track users' biometric states and media content play history. Play history may include a log-level record of control decisions made in response to player actor biometric states and other input. The server 200 may track user actions and biometric responses across multiple game titles for individuals or cohorts.

Sensor data from the one or more sensors may be processed locally by the CPU 302 to control display output, and/or transmitted to a server 200 for processing by the server in real time, or for non-real-time processing. As used herein, "real time" refers to processing that is responsive to user input without any arbitrary delay between an input and an output; that is, that reacts as soon as technically feasible. "Non-real time" refers to batch processing or other use of sensor data that is not used to provide immediate control input for controlling the display, but that may control the display after some arbitrary amount of delay.

To enable communication with another node of a computer network, for example the media content server 200, the client 300 may include a network interface 322, wired or wireless. Network communication may be used, for example, to enable multiplayer experiences, including immersive or non-immersive experiences of media content. The system may also be used for other multi-user applications, for example social networking, group entertainment experiences, instructional environments, and so forth. Network communication can also be used for data transfer between the client and other nodes of the network, for purposes including data processing, content delivery, content control, and tracking. The client may manage communications with other network nodes using a communications module 306 that handles application-level communication needs and lower-level communications protocols, preferably without requiring user management.

A display 320 may be coupled to the processor 302, for example via a graphics processing unit 318 integrated in the processor 302 or in a separate chip. The display 320 may include, for example, a color liquid crystal display (LCD) illuminated by light-emitting diodes (LEDs) or other lamps, a projector driven by an LCD or by a digital light processing (DLP) unit, a laser projector, or other digital display device. The display device 320 may be incorporated into a virtual reality headset or other immersive display system. Video output driven by a mixed reality display engine operating on the processor 302, or other application for coordinating user inputs with an immersive content display and/or generating the display, may be provided to the display device 320 and output as a video display to the user. Similarly, an amplifier/speaker or other audio output transducer 316 may be coupled to the processor 302 via an audio processor 312. Audio output correlated to the video output and generated by the media player module 308, media content control engine or other application may be provided to the audio transducer 316 and output as audible sound to the user. The audio processor 312 may receive an analog audio signal from a microphone 314 and convert it to a digital signal for processing by the processor 302. The microphone can be used as a sensor for detection of biometric state and as a device for user input of sound commands, verbal commands, or for social verbal responses to passengers. The audio transducer 316 may be, or may include, a speaker or piezoelectric transducer integrated to the apparatus 300. In an alternative or in addition, the apparatus 300 may include an audio output port for headphones or other audio output transducer mounted ancillary equipment such as a smartphone, VMC, xR headgear, or equivalent equipment. The audio output device may provide surround sound, multichannel audio, so-called 'object-oriented audio', or other audio track output from the media content.

The apparatus 300 may further include a random-access memory (RAM) 304 holding program instructions and data for rapid execution or processing by the processor, coupled to the processor 302. When the device 300 is powered off or in an inactive state, program instructions and data may be stored in a long-term memory, for example, a non-volatile magnetic, optical, or electronic memory storage device (not shown). Either or both RAM 304 or the storage device may comprise a non-transitory computer-readable medium holding program instructions, that when executed by the processor 302, cause the device 300 to perform a method or operations as described herein. Program instructions may be written in any suitable high-level language, for example, C, C++, C#, JavaScript, PHP, or Java™, and compiled to produce machine-language code for execution by the processor. The memory 304 may also store data, for example, audio-video data or games data in a library or buffered during streaming from a network node.

Program instructions may be grouped into functional modules 306, 308, to facilitate coding efficiency and comprehensibility, for example, a communications module 306 and a media player module 308. The modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. The modules may be high-level modules only. The media player module 308 may perform operations of any method described herein, and equivalent methods, in whole or in part. Operations may be performed independently or in cooperation with another network node or nodes, for example, the server 200.

In a vehicle, the apparatus 300 may provide video content for projection onto an interior surface of the vehicle as the display 320. For example, in a vehicle 400 shown in FIG. 4A, one or more ceiling-mounted projectors 418, 420, 422 may project media content from the apparatus 300 onto corresponding screens 416, 414, 417. In the illustrated configuration, two passengers 410, 412 sitting in a passenger space 404 while a driver 408 occupies a cockpit 402. The cockpit 402 may be isolated from the passenger space 404 by a sound wall 424. The projector 422 may project video from rear-facing cameras of the vehicle 400, showing the rear view for the driver. The projector 420 may project forward media content from the apparatus 300 onto a forward surround screen 414. The projector 418 may project rear media content coordinated in time to the forward media content onto the rear screen 416. "Forward" and "rear" are relative to the passengers' 410, 412 orientations, not the vehicle 400 orientation. Passenger and vehicle orientations may be aligned or non-aligned as shown in FIG. 4A. The rear screen 416 and forward screen 414 may be mounted on tracks enabling separation of the screens 414, 416 to admit or release passengers, and closure to enable a fuller surround view, up to and including a full 360° surround view.

In driverless (e.g., autonomous vehicle) configurations, the sound wall 424, rear view screen 417, projector 422, driver 408 and cockpit 402 are omitted, and the entire cabin of the vehicle 400 may function as a passenger entertainment space 404. In driverless embodiments, the rear projection screen 416 may be a surround screen like the forward screen 414.

Instead of or in addition to projection screens, electronic display screens may be used for display 320, for example, LCD or OLED screens in various resolutions, color spaces and dynamic ranges. In driverless vehicles, the cabin is easily darkened so either projectors or electronic screens should work well. FIG. 4B shows a configuration of an autonomous vehicle 450 in which the window screens are replaced by LCD screens 452, including a front screen 454, right side screens 456, 458 (one on each door) left side screens 460, 462 (one on each door) and a rear screen 464. One or more of the screens 452 may be transparent or partially transparent LCD or OLED panels (also called see-through displays) for augmenting the natural view of the vehicle exterior, may have an opaque backing for virtual reality, or may include an electronic or mechanical shutter to transition between opaque and transparent or partially transparent states. One or multiple LCD layers may be used as an electronic shutter to transition between opaque and transparent states. An apparatus 300 (for example, a VMC 152) may be coupled to the screens 452 for controlling video output. One or more passengers 468 in the cabin 466 may view video content as if looking through the window, in see-through or opaque modes. In alternative embodiments, the vehicle windows are equipped with mechanical or electronic shutters to darken the cabin, and the apparatus 300 outputs the video content to traditional LCD or OLED screens in an interior to the vehicle, or to projectors as shown in FIG. 4A. In an alternative or in addition, each of the passengers 468 may play the media content on a personal computing device, for example a smartphone, notepad computer or mixed reality headset.

In addition to conventional 2D output or 3D output for display on two-dimensional (flat or curved) screens (e.g., by televisions, mobile screens, or projectors), the media content output and control methods disclosed herein may be used with virtual reality (VR), augmented reality (AR) or mixed reality output devices (collectively referred to herein as xR). Some immersive xR stereoscopic display devices include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD or OLED display. Other immersive xR stereoscopic display devices use a built-in display screen in a similar frame. Either type may be designed to be worn close to the user's face, enabling a wide field of view using a small screen size such as in smartphone. The support structure may hold a pair of lenses in relation to the display screen. The lenses may be configured to enable the user to comfortably focus on the display screen which may be held approximately one to three inches from the user's eyes. The device may further include a viewing shroud (not shown) coupled to the support structure and made of a soft, flexible or other suitable opaque material for form fitting to the user's face and blocking outside light. The immersive VR stereoscopic display device may be used to provide stereoscopic display output, providing a more immersive perception of 3D space for the user.

Figure 5:
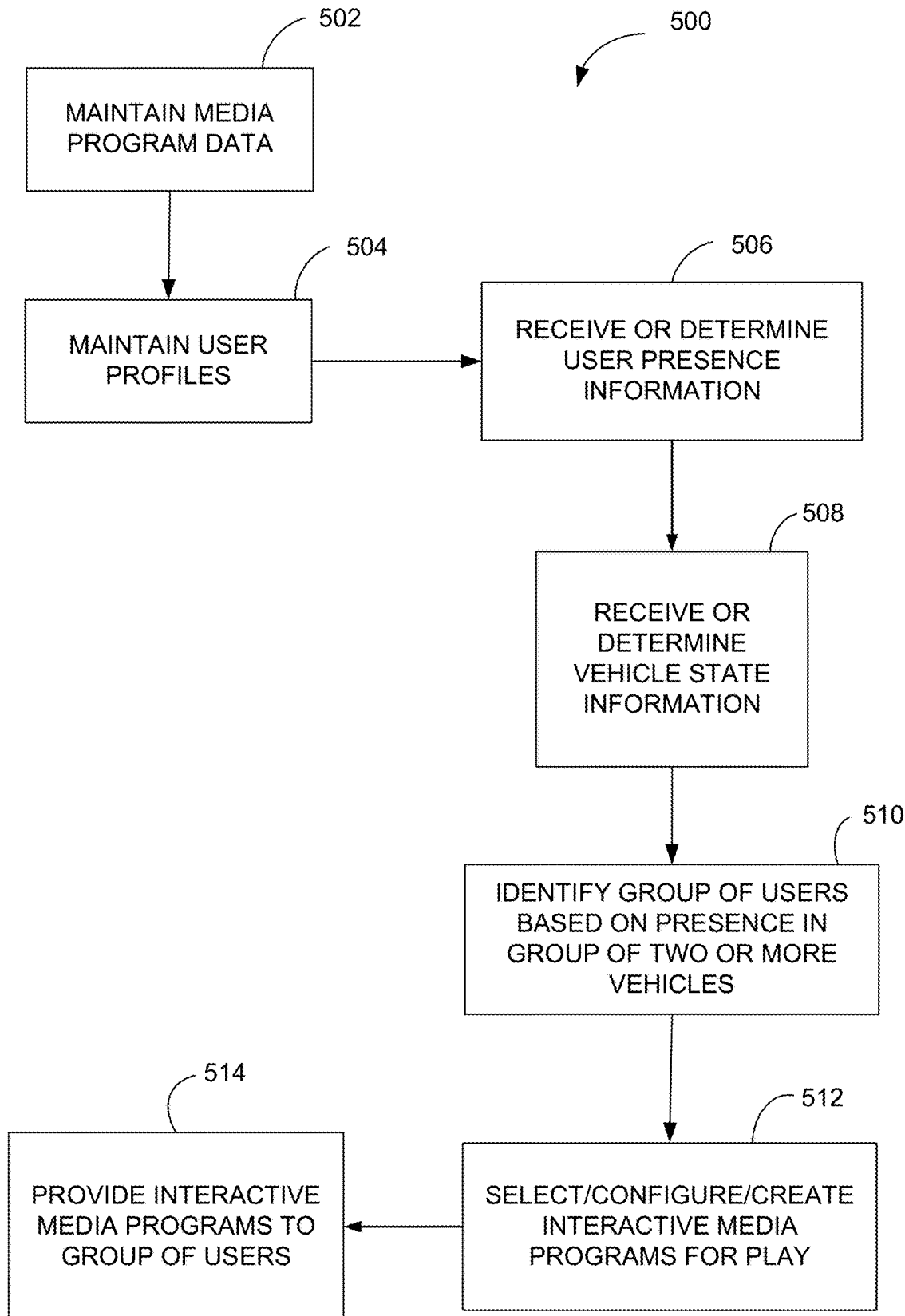
FIG. 5 is a schematic diagram illustrating an overview of providing media programs for play by a group of users in two or more moving vehicles.

FIG. 5 shows an overview 500 of providing electronics games for play by a group of users in two or more vehicles. The method 500 may be performed by one or more computer processors of a server or cooperating servers in electronic communication with client devices in the two or more vehicles, optionally including servers at points of interests along travel routes. The server or cooperating servers may be in one or more of the vehicles, and/or may be in a remote location. At the process 502, the one or more processors, at a content server, maintain media program data in a media program structure (e.g., a database). In an aspect, the media program data may include audio and audio-video games. At the process 504, the one or more processors maintain user profile data in a user profile data structure.

As used herein, "user presence" means one or both of: a contemporaneous presence of two or more users in different vehicles, or an asynchronous presence by one or more users in one or more vehicles wherein each of the one or more users is playing or has played the same interactive media or application relating to their vehicular travel. Also as used herein, "user presence information" means information enabling a processor to make a reliable determination concerning a present, past or anticipated user presence, for example, data sets of user identity or vehicle identity associated with time, vehicle identity or geographic location. At the process 506, the one or more processors may receive or determine user presence information from user devices. For example, each of the users of the user devices may register a user account with the one or more processors before or at the beginning a session. Once in a vehicle, each user may indicate via a user interface of their client device that they are ready to participate in a game with other users. In an aspect, the processors verify that the users are in two or more vehicles. At the process 508, the one or more processors may receive or determine vehicle state information from vehicles. In an aspect, each of the vehicles has registered with the system of the one or more processors.

At the process 510, the one or more processors may identify a group of users based on a contemporaneous presence by each user in the group in two or more vehicles, or in an alternative, based on an asynchronous presence in a similar trip environment participating in the same game or interactive experience. In an aspect, the one or more processors may identify the group by further identifying an indication of interest by each user in the group to interact, for example play games with one or more other users in the group during the user presence. In an aspect, the one or more processors may identify the group based on future co-presence for game play at a future contemporaneous presence. In some embodiments, the one or more processors may detect, based on vehicle, location or trip data and on user profile data that two or more users traveling in different vehicles may have an interest in a mutual game. Based on the detection, the one or more processors may push an invitation to join a common game to each user and join client devices that respond in a game session. The one or more processors may detect the user's travel plans by integration with a navigational application and may detect user presence in a vehicle using a network node placed therein.

At the process 512, the one or more processors may select, configure or create an interactive media program of interactive game for playing by the group of identified users above. The interactive media program may be configured for output by respective interactive media players of each user of the group of users. At the process 514, the one or more processors may provide the interactive media program to the interactive media players of the identified users in the identified two or more vehicles.

In an aspect, one or more processors at the content server may perform one or more of the processes 502-514. In another aspect, one or more processors at the connected vehicles may perform one or more of the processes 502-514. Therefore, it should be noted that the following descriptions of these processes refer to either the content server or the vehicle, unless noted otherwise.

Figure 6:
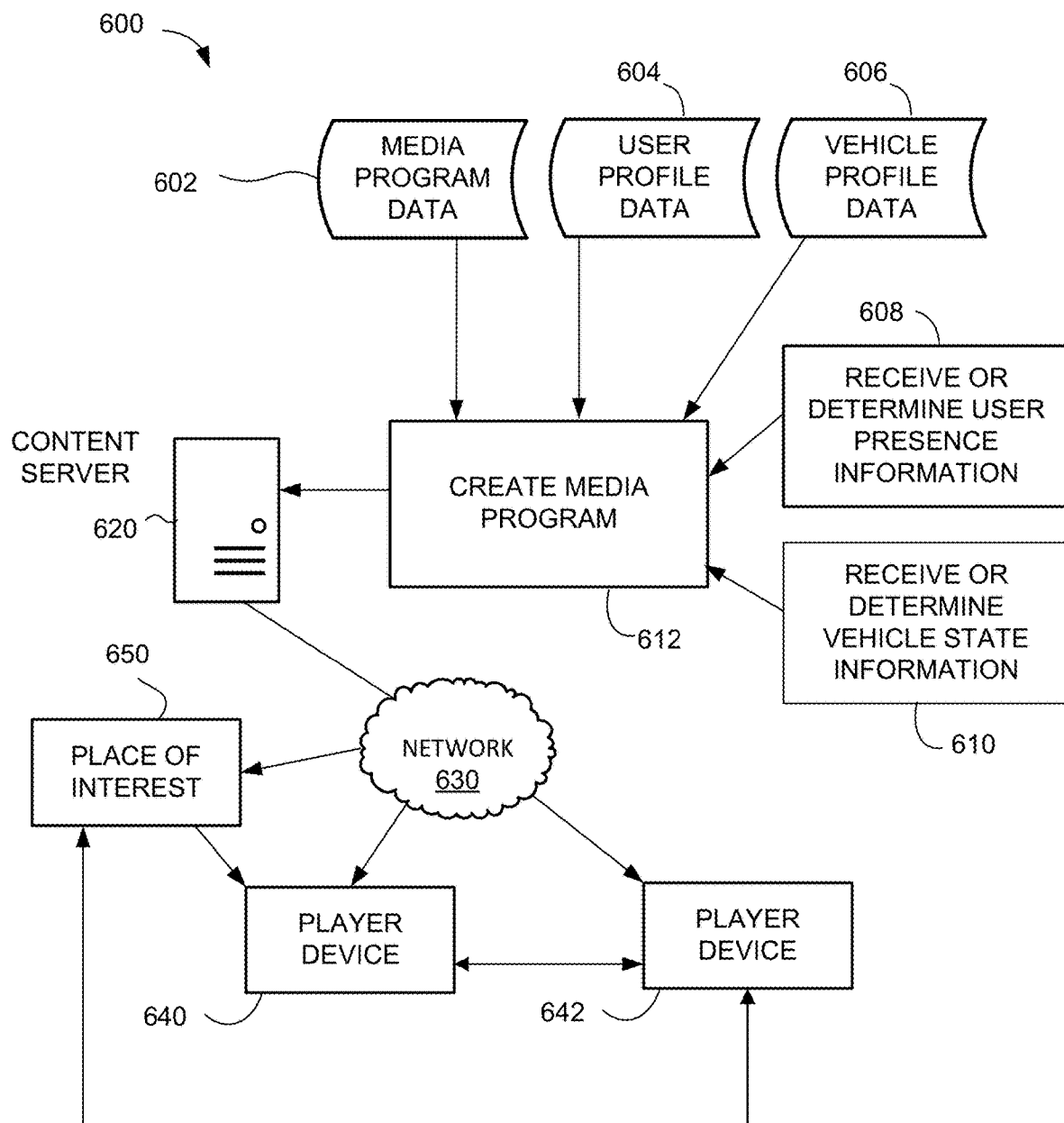
FIG. 6 is a block diagram illustrating an example of a computer network in which the novel methods and apparatus of the application may find use.

FIG. 6 summarizes a computer network 600 in which the novel methods and apparatuses of the application may find use. One or more content servers 620 (e.g., a server farm or cloud) interconnected through a local area network, wide area network 630, or other network may execute the processes and algorithms described herein, creating digital media programs that may be stored and distributed for contemporaneous use by a group traveling in different vehicles. In some cases, portions of media program data 602 may be in analog (e.g., film) and converted to digital form using any suitable conversion process, for example, digital scanning. A content server may select and/or configure a media program using media program data 602, user profile data 604, and vehicle profile data 606 based on user presence information 608 and vehicle state information 610. One or more distribution servers may provide content for processing or delivery to servers at places (or points) of interest 650 along the route and to player devices 640-642, from the content server 620 through the network 630, e.g., the Internet or cellular telephone and data networks, and one or more router/modems/hotspots. In some embodiments, points of interest may be marked by short range (e.g., about one hundred meters or less) radio beacons placed in the environment. In an alternative, or in addition, the processor may locate places of interest by computing geographic proximity relative to a table of geographic locations. In an aspect, beacons outside the vehicles and placed perhaps by some lead vehicle player(s) may be used to signal the following vehicle's or vehicle inhabitant's processors or sensors that they are near the beacon(s). Beacon placement by players or game administrators may be used for explicit, hidden, or bluffing purposes, e.g., beacon signals may be used to indicate arrival of players to a destination; for providing secret messaging only known to some, e.g. the lead vehicle person who wants to otherwise secretly know about a following vehicle's route progress; and/or to bluff or otherwise deceive players about where another vehicle or object of interest in the game is located.

The player devices 640-642 and places of interest 650 may be connected via a mobile mesh network. Each player device 640-642 may connect to remotely networked devices through a vehicle controller (VC) of the vehicle in which the media player is located. The media player 640-642 may include, for example, smartphones, personal computers, notepad devices, projectors, and wearable xR devices. The media program may be transcoded to a suitable format for the player device 640-642 prior to delivery.

FIG. 7A diagrams a useful automatic process 700 for providing electronic games for play by a group of users in two or more vehicles. In an aspect of the present disclosure, the process 700 may be performed by one or more processors at a content server. At 702, a processor accesses a data structure of media program data in a first database, a data structure of user profile data in a second database, and a data structure of vehicle profile data in a third database. The media program data may include, for example, discrete segments or components of digitally encoded audio, audio-video, virtual reality, augmented reality, game logic, or elements for multi-dimensional rendering for producing output for consumption in the vehicles. Output may include, for example, entertainment, instructional, advertisement, video gaming, social networking, or social gaming application. In an aspect, the processor may maintain the first, second and third database as separate databases, or in any combination.

At 704, the processor receives or determines present or anticipated future user presence of one or more users that have registered their client device with the system of the processor. The processor may determine that two or more users are traveling contemporaneously, for example. In an alternative, or in addition, the processor may link a current user session with past (asynchronous) sessions of the same game or user experience by the same user and/or different users, enabling multi-user participation in a game or experience at different times. In an aspect, the processor may receive or determine user presence from GPS-based applications located in a user or player device. Based on detecting the presence of a registered client device in the vehicle, the system may infer that the user to whom the device is registered is in the vehicle. In another aspect, the processor may receive or determine user presence from GPS-based applications and components that are part of, or connected to, a vehicle controller (VC). In another aspect, the processor may receive or determine user presence from non-GPS-based applications located in a vehicle. In this aspect, a user device may register with a VC when the user enters the vehicle, or the user may register manually with the VC when the user enters the vehicle or at any time while the user is still present in the vehicle. In an aspect, the one or more processors may update the user presence information for each user based on the most current user presence information, in response to changes in user presence, or periodically. Accordingly, the one or more processors may monitor a current state and past states of user presence during a multi-vehicle session. In some embodiments, beacons outside the vehicle may be used to trigger an in-the-vehicle sensor for determining user presence and/or features of the external environment.

At 706, the processor receives or determines vehicle state of one or more vehicles that have registered with the system of the processor. A vehicle state may include, for example, the location, velocity, and navigational plan for the vehicle; types of client devices in or connected to the vehicle; available media content for the vehicle based on bandwidth, data storage, or other technical factors or based on a subscription or license; available input devices such as cameras or microphones in or connected to the vehicle, and useful combinations of the foregoing. In an aspect, the processor may receive or determine a vehicle state or portion thereof from GPS-based applications or tracking device located in the vehicle. In another aspect, the processor may receive or determine vehicle state or a portion thereof from non-GPS-based applications located in a vehicle, for example, a digital speedometer, compass, temperature sensor, vision system, and so forth. In an aspect, the processor may update the vehicle state data with the received or determined vehicle state information.

At 708, the processor identifies a group of users selected from users identified at 704 above, based at least in part on one of: a contemporaneous presence by each user in the group in two or more vehicles determined at 706 above, or common participation in a game or other group experience for related trips at different times. The processor may execute an algorithm to select the group of users from those sharing a contemporaneous presence, for example, based on similar user profiles, preferences or interests. In an alternative, or in addition, the processor may select the group of users based on express indications of user interest, for example by including participants who have transmitted an indication of interest to the processor. In an aspect, the processor may send invitations to join an interactive content session (e.g., a game) to users it identifies based on factors noted above as likely to be interested. The processor may update and track current and past membership and participation in any group event using an appropriate data structure.

Interactive multi-user media programs are made for contemporaneous use by nature. So, in selecting users, the algorithm may make use of input relating to each participant's purpose for being in vehicles at a shared time, or surrounding circumstances. For example, participants may be traveling to a common destination, or away from a common origin. They may be in vehicles specially equipped for a certain type of game; for example, vehicles equipped with lasers or laser sensors designed to interact with objects placed in the environment, or with surround screen systems.

As noted above, beacons placed in the environment, may be used to trigger in-the-vehicle sensors for triggering game play events, including interactions with outside objects. They may have planned trips estimated to require similar amounts of time or be traveling on the same route. They may be in a certain geographic area (e.g., Southern California, or Burbank) and may wish to play with others in the same area, or in a different area. Contemporaneous presence in vehicles is a threshold requirement but is usually not enough to identify a suitable group of users, depending on the media program.

At 710, the processor selects, configures or creates a media program (e.g., a game) for use by the group of identified users at 708. In an aspect, the interactive media program is, or includes, an interactive, multiplayer game. In another aspect, the media program is a non-interactive, multiplayer game. In an aspect, the processor selects, configures or creates the media program based at least in part on data from the user profiles of the identified users and/or in part on data from the corresponding vehicle profiles. In an aspect, the processor selects, configures or creates the media program based in part on the specifications of the media player at each vehicle, for example whether the media player has three-dimensional (3D) or mixed reality (xR) capabilities.

The processor may configure the media program to enable players in different vehicles to play various games or share experiences. Use cases may include, for example, games having outcomes that depend on interaction between each vehicle and its environment and/or social interactions between players, sometimes referred to herein as "real-world" games. Examples of real-world games include driving games, observational games, and social games. Other use cases may include alternative reality (AR) games, wherein the players interact via a fantasy environment that reacts to user input and the real environment of the vehicle. AR games may include driving games, observational, and role-play games all played in a fantasy environment, and any other video game in which the processor alters game play in response to location and movements of players in different vehicles. Each of the game types may be played in real-time, synchronous mode in which the processor receives and processes data from all players contemporaneously, or in asynchronous mode in which players participate at different times and the processor afterwards compares records (e.g., scores) of game play. The processor may provide each game type in one or more different styles of play, for example: cooperative play, in which players cooperate to reach a common goal; team play in which teams compete against one another while players within team cooperate; competitive games, in which each player competes individually; elimination games in which players compete to extinguish others from the game; and puzzle games in which each player works alone on a puzzle or exploratory map. The processor may reveal the players' identities to one another. In an alternative, the processor may conceal the players' identities from one another. Player entities may be individuals, teams, computer-controlled characters, or a combination of the foregoing.

In driving games, players compete in navigation (way finding), speed on off-road tracks, safe driving, tagging other objects or vehicles (e.g., with a harmless wireless beam or the like), registering a la Square, their proximity or arrival at some beacon(s) along the route, or other attributes of motor vehicle control. These games differ from social navigational applications in which users can earn participation points or tokens by using or providing navigational data (e.g., Waze™). Instead of open-ended applications run primarily as a navigational aid for individual users, real-world games may be limited to definite player groups and play periods, focusing on entertainment value of friendly competition. At the implementation level, processes as described in connection with FIG. 7A distinguish real-world games from social navigation application. Further differences are apparent in the description of more specific games below.

Driving games may include elements of way finding or route selection, speed or efficiency, and safety or legal compliance. Any specific game may combine these elements in different amounts depending on user preferences and constraints of the operating environment. For example, two or more drivers of different vehicles may agree to compete on finding the shortest route between two points, or the fastest route, subject to safe driving limits. Passengers can also compete, either as 'navigators' for the drivers, or otherwise having input to the driverless vehicle's navigation system. The processor may enable the selfsame passenger or driver to compete with her best prior shortest or fastest or most scenic or . . . route score. For asynchronous trip game play, the processor may manage and serve a competition wherein a player can compete and/or cooperate to achieve a goal via related asynchronous trips. For example, the processor may serve a scavenger hunt game wherein players visit route locations where other player(s) have already been to retrieve some item(s), log the visit, or expose otherwise hidden items that are only revealed if another player has already discovered, photographed, tagged, or otherwise exposed them. In an alternative, or in addition, players might compete for the title of safest or most considerate driver. In each of these games, the processor executing the media program may score behavior of the vehicle and report a leaderboard.

Figure 7B:
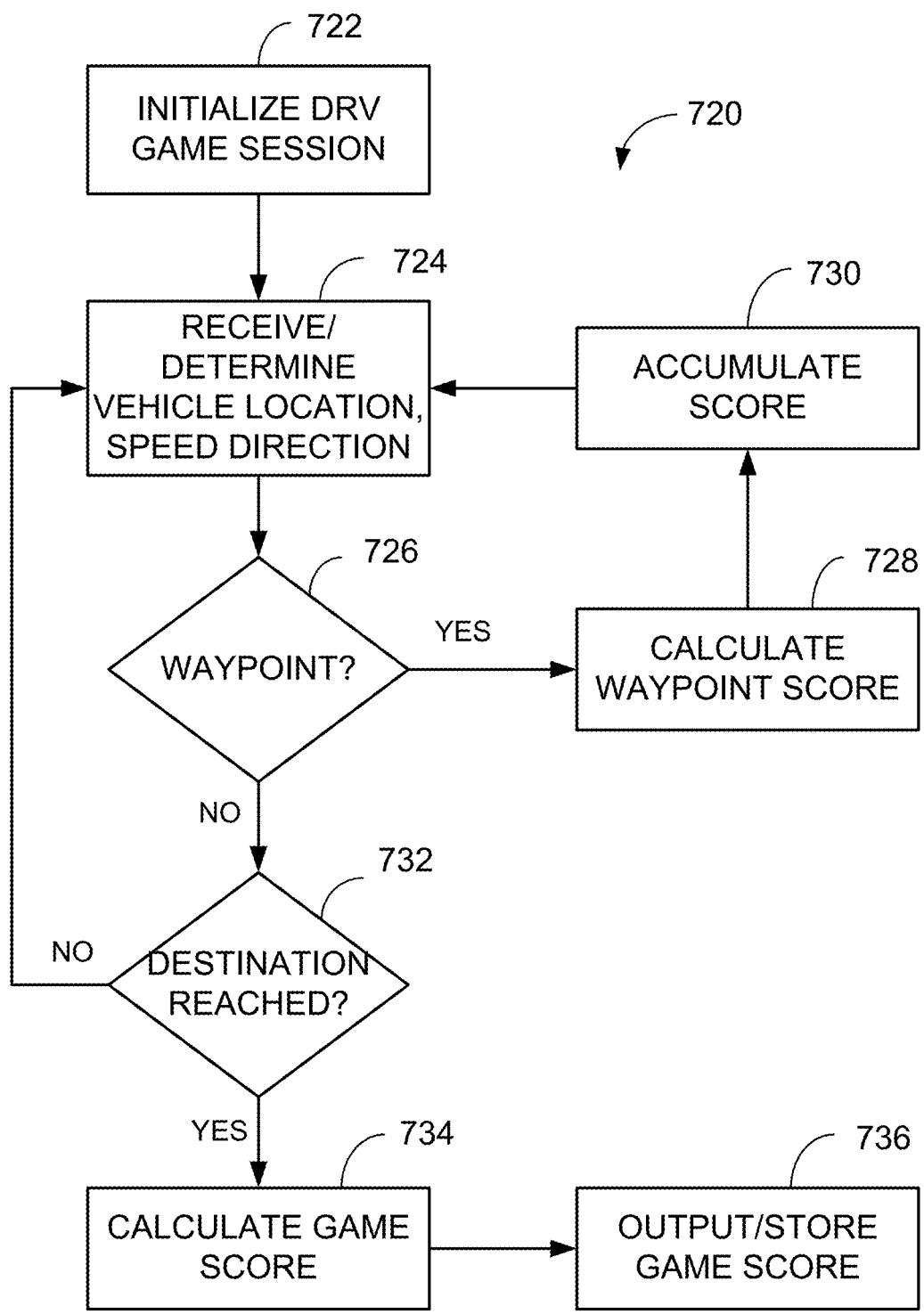
FIG. 7B is a flow diagram illustrating a process for a real-world driving game for play by a group of users in two or more moving vehicles.

FIG. 7B is a flow chart showing an example of processor operations during a driving game 720. For example, in an aspect, the driving game may involve two drivers, Adam and Ben, driving Vehicle One and Vehicle Two, respectively. As shown in FIG. 7B, the example driving game involves Adam and Ben competing for the title of the safest driver, contemporaneously or asynchronously. Adam and Ben, who both live in the same apartment complex in Santa Monica and work at the same workplace in Downtown L.A., each start driving from their apartment complex to work at approximately 7:00 a.m. At 722, the processor initializes the driving game session, where the goal is to compete for the title of the safest driver. For example, the scores for Adam and Ben are initially set to zero. Or, in another example, the scores may be the cumulative scores. The scores may be recorded as part of the user profile data in a database. In an aspect, the processor awards scores for driving behaviors that are legally compliant, and deducts points for traffic violations or unsafe driving behaviors. At 724, the processor determines that Vehicle One and Vehicle Two are initially parked at 1519 6$^{th}$ Street, Santa Monica, CA, based on the GPS geolocation information obtained from the vehicles. Adam and Ben start driving to work at 7:00 a.m., heading to the office in Downtown L.A., taking Olympic Blvd. At the process 726, at 7:03 a.m., Adam and Ben stops at the red light on Lincoln Blvd., waiting to make a left turn onto Olympic Blvd among many other morning commute drivers. This is a waypoint, and the processor at 728 calculates the waypoint scores for Adam and Ben. While Adam has activated his turn signal approximately 100 feet prior to entering the left turn lane, Ben failed to activate his turn signal at all. The processor awards one point to Adam, while the processor deducts 1 point for Ben, because California traffic law requires a turn signal in the last 100 feet before a turn if any other vehicle may be affected by the movement. The turning of Vehicle One and Vehicle Two would both affect other morning commute vehicles at the intersection. At 730, Adam's score is one, while Ben's score is negative one. At 7:05 a.m., the light turns to green, and Adam proceeds to make a left turn safely. However, Ben enters the intersection to make a left turn while the light has already turned to red. The process, again at 726, proceeds to calculate the waypoint scores for Adam and Ben. While Adam is not deducted any point, the processor at 728 deducts one point from Ben, because he has run a red light. At 730, the processor accumulates the scores for Adam and Ben: one and negative two, respectively. At 724, at 7:25 a.m., both Vehicle One and Vehicle Two approaches Los Angeles High School, where a school bus is stopped at a curb side to drop off students. At 726, Los Angeles High School is another waypoint. Adam, seeing that the school bus is stopped with flashing red lights, proceeds to stop. Ben, on the other hand, fails to stop and proceeds to drive past the school bus. At 728, the processor calculates the waypoint scores for Adam and Ben. The processor awards one point to Adam for properly stopping and remaining stopped when the red lights on the school bus are flashing. The processor deducts one point from Ben for failing to stop. At 730, the accumulated scores for Adam and Ben, as calculated by the processor, are two and negative two, respectively. At 7:45 a.m., both Adam and Ben approach Staples Center, their workplace. At 726, Adam proceeds to drive down Olympic Blvd. and waits for a right turn onto S. Figueroa St. At 726, Ben, on the other hand, decides to take a shortcut onto a side street, where it is illegal to do so between 7:00 a.m. and 9:00 a.m. At 728, the processor calculates the waypoint scores for Adam and Ben, where Adam is not deducted any point, but the processor deducts one point from Ben for driving illegally on a restricted street. At 730, the accumulated scores for Adam and Ben are two and negative three, respectively. At 7:26 a.m., Ben arrives first at the workplace, at 732, reaching the destination. At 7:727 a.m., Adam also arrives at the workplace at 732. The processor at 734 calculates the game scores for Adam and Ben, where Adam has two points, and Ben has negative three points. At 736, the processor outputs the respective game scores to the displays in Vehicle One and Vehicle Two. The winner of the driving game in this example 720 is Adam. In some aspect, the processor may store the games scores in the game database, for example, as part of the user profile data for Adam and Ben.

Observational games entail scoring by a processor of player observational interactions via a client device with roadside objects. For example, players may record their observations by taking a picture of each observed subject using their smart phone or similar device running a client application communicating with a game server. The processor of each client may time-stamp and recognize the object image, and assign a score based on the observation and optionally other factors, for example, time of observation, location of observation, or relative difficulty of the observation, and provide to the game server. Players can compete or cooperate to find objects during contemporaneous travel or asynchronously, depending on user preference.

Figure 7C:
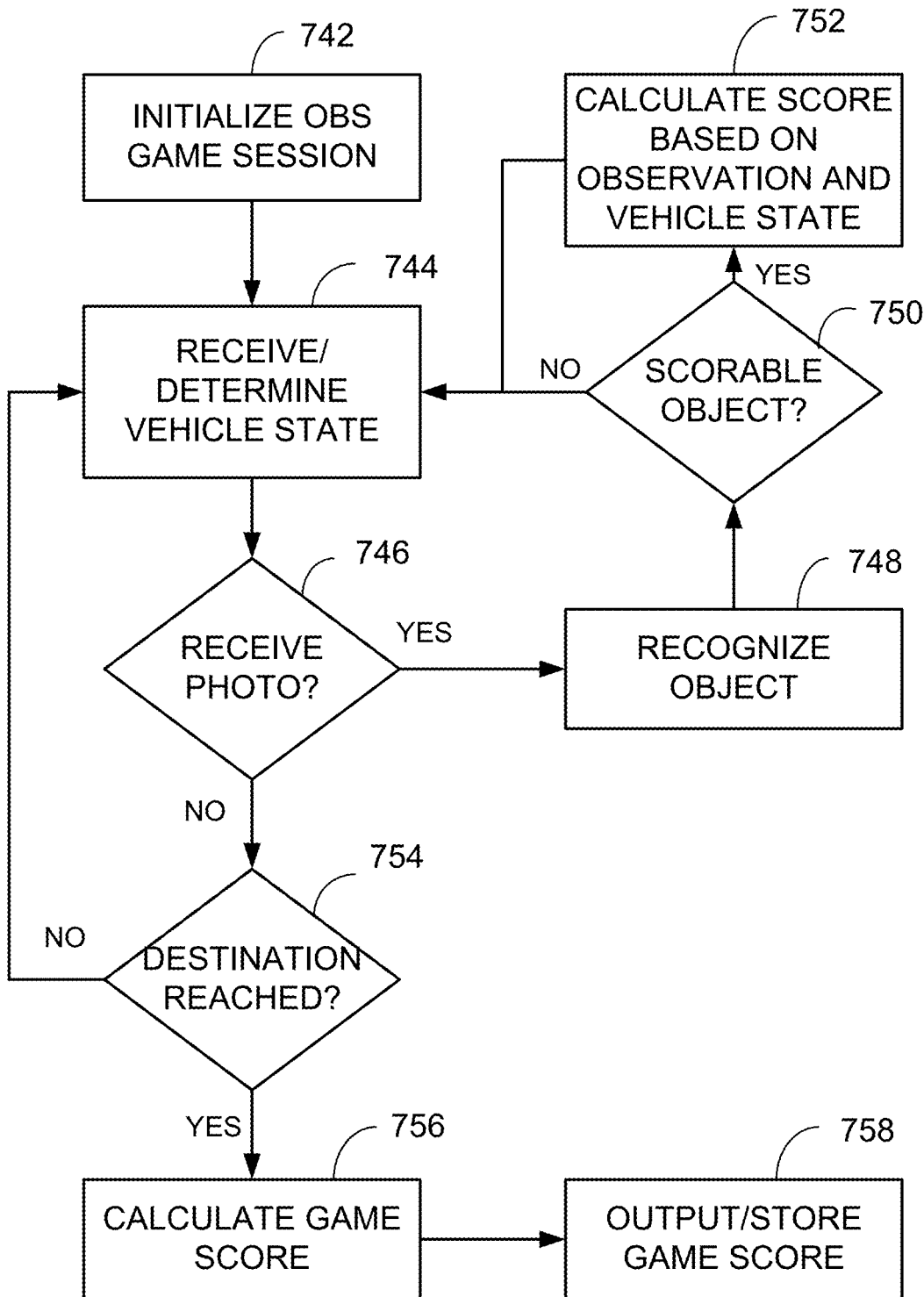
FIG. 7C is a flow diagram illustrating a process for a real-world observational game for play by a group of users in two or more moving vehicles.

FIG. 7C is a flow chart showing an example of processor operations during an observational game 740. For example, in an aspect, the observational game may involve two drivers, Adam and Ben again, this time riding autonomous Vehicle Three and autonomous Vehicle Four, respectively, to commute to work from their apartment complex. As shown in FIG. 7C, the example observational game involves Adam and Ben competing for the title of highest observational score, whether during travel at the same time or at different times. For example, the observational game 740 may involve capturing images of blue objects. At 742, the processor initializes the observational game session, where Adam and Ben each start off with a score of zero. As in the driving game example above, the scores may instead be cumulative scores. At 744, both Vehicle Three and Vehicle Four pick up Adam and Ben from their apartment complex, respectively, and start driving off. Immediately upon departure, Adam captures an image of a bicyclist riding a blue mountain bike, while Ben also attempts to capture the same image but unfortunately was too late in doing so, and the picture only captures another bicyclist riding a green bike. Both images are captured by smartphones communicably connected to the game server. At 746, the processors receive the photo images taken by Adam and Ben. At 748, the processor recognizes that Adam's photo includes a blue bike, while Ben's photo includes a green bike, not blue. At 750, the processor determines that Adam's photo contains a scorable object (blue bike), while Ben's photo does not. At 752, the processor calculates and awards one point to Adam, while the processor awards no point to Ben. Alternatively, the processor may deduct one point from Ben for submitting a photo of a wrong observational element (e.g., green bike instead of blue). The process returns to 744. While Vehicle Three and Four drive near Roxbury Park on Olympic Blvd., Adam sees a bluebird and captures its image. Ben, on the other hand, sees a blue Ferrari. At 746, the processor receives the photos of the bluebird and the blue Ferrari. At 748, the processor recognizes the bluebird in Adam's photo, and the processor also recognizes the blue Ferrari in Ben's photo. At 750, the processor determines that both the bluebird and the blue Ferrari are scorable objects in game 740. At 752, the processor calculates and awards two points to Adam, because bluebird is a rare sight. The processor calculates and awards only one point to Ben, because Ferraris are not a rare sight in Beverly Hills. At 754, Vehicle Three and Vehicle Four arrive at Staple Center, the destination for Adam and Ben. At 756, the processor calculates the game scores for Adam and Ben at this point: three for Adam, and one for Ben. Adam wins the observational game 740. The processor outputs the game scores on the displays of Vehicle Three and Four. In some aspect, the processor stores the game scores in the database, for example, as part of the user profile data. The processor may also store current data for use in future asynchronous game sessions. Instead of, or addition to, competing with one another, player groups may also cooperate to find the most qualified observations in team play or to achieve a common purpose.

Social games use vehicular travel as a catalyst for encouraging social interactions between people traveling in different vehicles. These games may have a variety of designs and objectives. For example, social games may be used to introduce new people interested in meeting new people with shared interest; reconnecting people who happen to be sharing a travel experience in different vehicles; facilitating and prompting topical conversations on items of interest pertaining to travel; conversational games providing for guided social interaction, social puzzle solving; and sharing of electronic content, fundraising for social causes, or organizing group activities at shared destinations or otherwise.

Figure 7D:
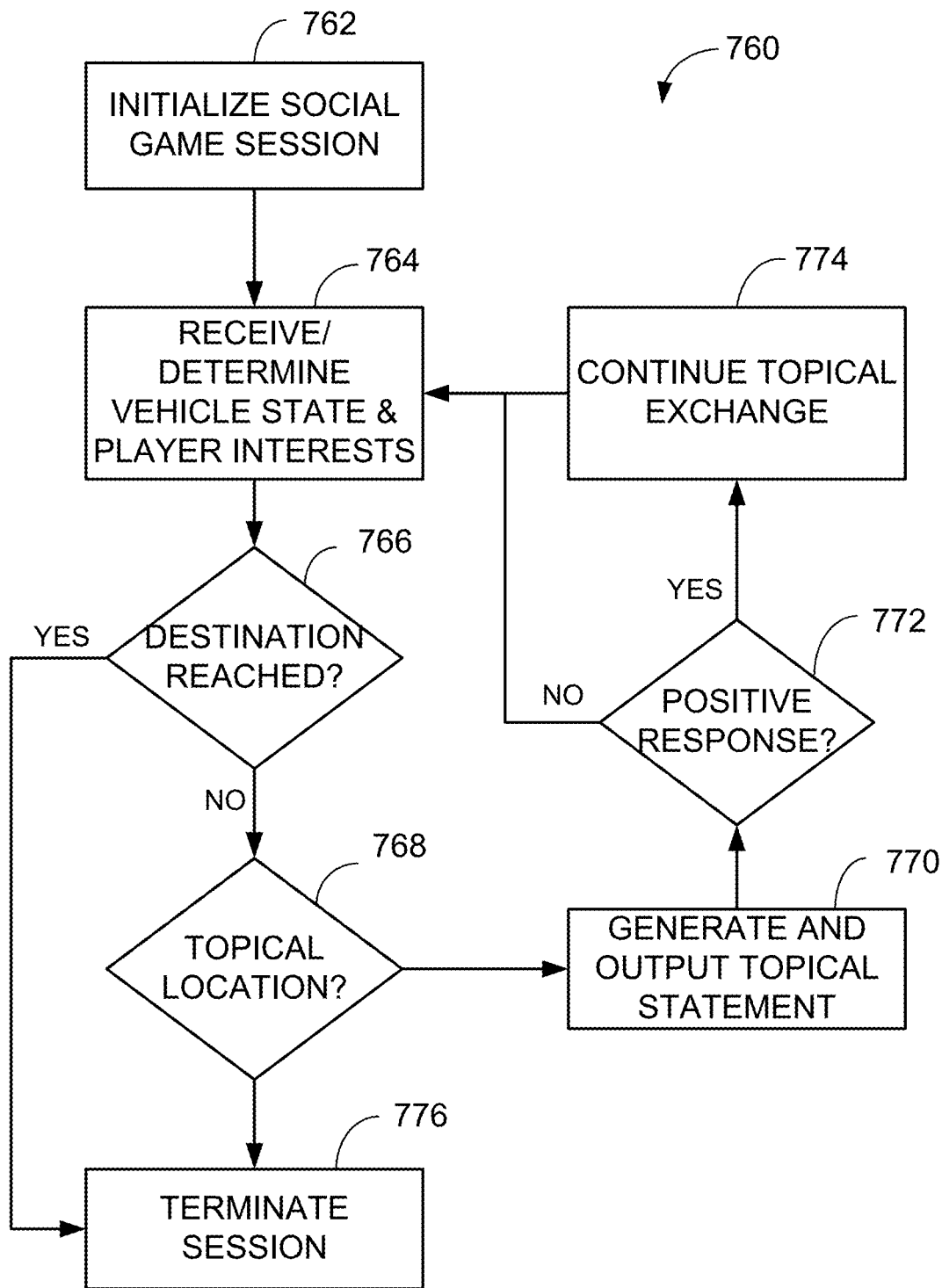
FIG. 7D is a flow diagram illustrating a process for a real-world social game for play by a group of users in two or more moving vehicles.

FIG. 7D is a flow chart showing an example of processor operations during a social game 760. For example, in an aspect, the social game may involve multiple participants, Adam, Carl, David, and Ed, riding (or driving) Vehicle Three, Vehicle Five, Vehicle Six and Vehicle Seven, respectively, where each vehicle may be autonomous or human-driven. As shown in FIG. 7D, the example social game involves Adam, Carl, David, and Ed participating in the social game of "Burger and Movie Meetup in West LA." The objective of the game is to meet up and eat hamburgers before finally reaching the movie theaters in Century City, the final destination. In this example, Adam, Carl, David, and Ed are strangers, and they chose to participate in this social game when the meetup event was announced online by Adam, the event host. The social game may be planned in advance of the participants riding or driving their vehicles, or the game may be initiated impromptu as one participant invites random or known passengers or drivers in contemporaneous presence. The social game 780 may be membership-based (for fee or otherwise), or it may be open to any vehicle passengers or drivers of concurrent conveyances interested in attending the meet-up. The meet-up may be scheduled for a particular time, or for a range of times (e.g., every Tuesday from 6 to 8 pm), or may be determined by an ad hoc determination of a common interest (e.g., to meet friendly strangers over hamburgers). At 762, in an aspect, Adam has announced the meetup event at 5:30 p.m. using a social game app on his smartphone, as he leaves and drives away from work on a Friday evening in Vehicle Three. The meetup is scheduled to convene initially at a hamburger shop somewhere near the Century City theaters, around 6:30 p.m., followed by a movie watching at the Century City theaters thereafter. One of the features of the social game in this example is that the exact destination is not pre-determined, and instead, the destination may be fluidly determined by the aggregate interests of the game participants. In the present example, the participants discuss alternative meeting places, but the process of FIG. 7D may be applied to any topic of interest, including but not limited to news of the day, topics of shared special interest to the participants, interesting locations along the traveler's routes, events happening at a common destination, and so forth.

In the case of discussing meeting locations, for example, each game participant may suggest a hamburger shop, and the participants may vote on the favorite one to go to. Immediately, Carl and David, who are on their way home from their respective workplaces in Burbank and heading back to their home area in West L.A. on Vehicle Five and Vehicle Six, respectively, respond and announce their interest in participating in the meetup, using the social game app installed on their respective smartphones. The user interactions for the social game app may be performed directly on the smartphones via various user interface means including, for instance, touchscreen (e.g., finger tapping, swiping, typing, etc.), microphone (via voice input), camera (via gesture recognition input), etc. Alternatively, or in addition, the respective vehicles may be equipped with similar or other user interface means to detect user interactions, such as text, voice, and gesture inputs. Ed, who is still at work in Culver City but expects to be able to leave work at 6:00 p.m. to head home towards West L.A., also accepts the meetup invite from Adam. At 764, the processor thus determines that Adam, Carl, David, and Ed, who are riding/driving their respective vehicles from their respective places of origin and heading generally toward West L.A., are participating in the meetup 760. At 766, the destination is tentatively set for Century City theaters as part of the social game. At 768, Ed announces to the game participants through the social game app that he has just taken off from work at 6:00 p.m., and at 770, Ed suggests Umami Burger in Santa Monica for the burger shop candidate. Ed's suggestion is outputted as a text, audio, or visual message to the other participants through the social game app, where the generated output may be outputted via smartphone, in-car entertainment system, or another output device communicably connected to the game server and processor. However, Adam, Carl and David rejects this proposal at 772, because they all live near Umami Burger and frequent there often, such that they want to eat at another place. At the process 768, at 6:15 p.m., Carl suggests LA Burger Bar on La Cienega and Pico, as he passes through Korea Town on Pico Blvd., where the processor at 770 generates and outputs Carl's suggestion to the rest of the game participants. At 772, Adam responds positively to Carl's suggestion as he, too, is also heading westbound on Pico Blvd. from Downtown L.A., but both David and Ed respond in the negative. At 774, the participants continue the topical exchange, for example, via text, audio, or visual message. David states at 774 that he is not passing through Koreatown and would not want to make a detour there. Ed states at 774 that LA Burger is out of his way and would not want to make a detour, either. As a result, the game participants decide not to go to LA Burger. At 768, Adam approaches the Apple Pan on Pico Blvd., and at 770, Adam proposes eating at the Apple Pan for the meetup, where the processor generates and outputs the invite to meet at the Apple Pan. At 772, Carl, David, and Ed all respond positively to Adam's invite to meet at the Apple Pan via one or more messaging means above-described. At 774, all the participants (and their autonomous vehicles, to the extent any of the vehicles are autonomously driving) head toward Apple Pan. At the 764, the processor for the social game app updates the destination by adding Apple Pan, either as the final destination in lieu of Century City theaters (especially if the autonomous vehicle is a ride share, and the passenger would not be taking the same vehicle to the movie theaters) or as the intermediate destination before the movie theaters (e.g., if the vehicle will continue to be driven/ridden to the movie theaters after the burger shop). The destination may or may not be set separately for each participant based on certain criteria, such as whether the vehicle would continue to be driven/ridden to another destination, or whether the participant chooses to leave the game at any point. At 766, when the vehicles reach Apple Pan, the destination, the social game session 760 terminates (either momentarily or entirely) at 776. For the vehicles or participants that would continue on to the Century City theaters, the social game session 760 is momentarily terminated (or paused), and resumed when the participants head to the movie theaters, where the similar process flow in 760 may or may not repeat to decide on, for example, which movie theater to go to (Century City theaters as originally proposed, or rather some other theaters), which movie to watch, at what showtime, etc. For example, the processor may output possible movie showings and showtimes at nearby movie theaters to the game participants at 762, or 768, either before or while the participants and their vehicles are heading toward the destination.

Alternative reality games place the player in a computer-generated environment using virtual reality or augmented reality gear, including both headsets and surround screens. Surround screens may in some embodiments replace vehicle windows. Game play may be of any type that can integrate vehicle state data to enhance game, including any of the three types of travel games summarized above, and games such as, for example, role playing, fantasy, racing, battle, and strategy games enhanced by vehicle state data.

Figure 7E:
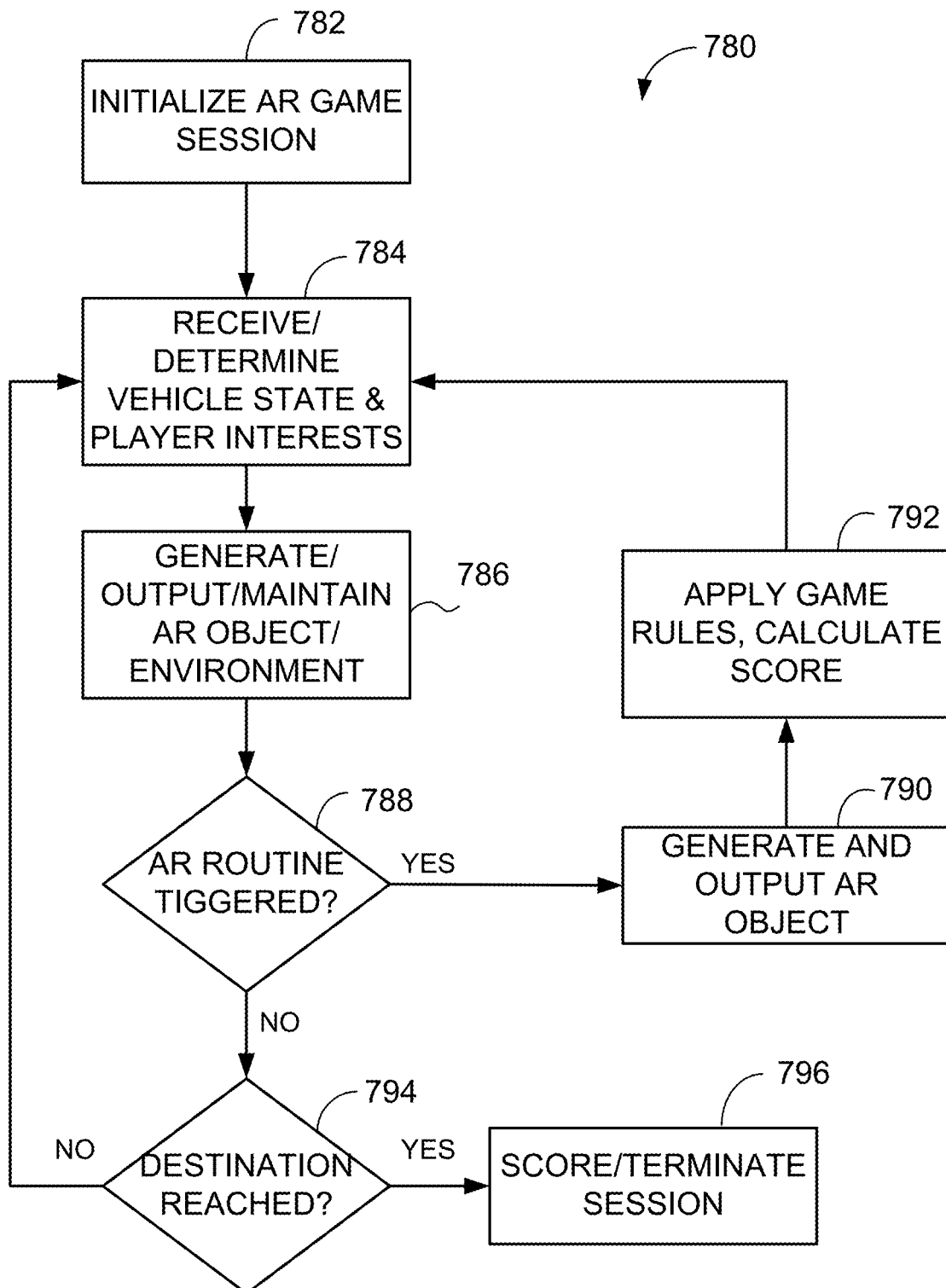
FIG. 7E is a flow diagram illustrating a process for a fantasy game for play by a group of users in two or more moving vehicles.

FIG. 7E is a flow chart showing an example of processor operations during an alternative reality game 780. For example, in an aspect, the alternative reality game may involve one or more participants riding (or driving) autonomous or human-driven vehicles. As shown in FIG. 7E, the example alternative reality game involves Ben and Ed participating in a fantasy racing game 780 of "Kill Evil Dragons on Mulholland Drive to Save the Princess." The objective of the game is to drive on Mulholland Drive starting at Interstate 405 and ending at Highway 101, where the princess awaits in her castle in the alternative reality. For safety, the fantasy game can only be played by passengers in autonomous vehicles that cannot be influenced to take unsafe actions for the sake of game play. At 782, the processor initializes the alternative reality game session by welcoming Ben and Ed to the game (e.g., with audio-visual welcome message outputted through the virtual/augmented reality gears such as the headset worn by the players and surround screens inside the vehicles), when Ben and Ed enter their respective vehicles parked at the start line prior to starting the game. At 784, the processor prompts Ben and Ed whether they wish to commence the game 780, to which Ben and Ed replies affirmatively. At 786, the processor generates, outputs and maintains alternative reality objects an environment, which simulates the scenery of the game players riding on flying unicorns along the twisted path of Mullholand Drive infested with evil dragons flying everywhere. For example, the surround screen in the vehicles may display a fantasy scenery of a magical world where the sky is purple and filled with monsters and dragons. At 788, the processor triggers the alternative reality routine when Ben and Ed take off from the start line. In an aspect, the vehicles ridden by Ben and Ed are autonomously driven. At 790, the processor generates and outputs the monsters and evil dragons flying around Mullholand Drive. At 792, the processor applies the game rules and calculates scores. For example, black, red, green, and blue dragons are evil, and when they are shot down, they count as 5, 4, 3, 2, and 1 points each respectively. However, gold and white dragons are good, and when they are shot down, they count as negative 10 and 5 points each. Other monsters may be carrying game items (potions) such as "Heal Life," "extra Magic," and "Extra Arrow," where shooting down such monsters may yield such game items to be used by the game players during game play. Players may 'shoot down' the dragons and monsters using an input device communicably connected to the game server and processor. For example, the vehicle horn may activate the firing of a shooting magic or arrow to shoot down the dragons and monsters in the alternative reality game 780. Other virtual or augmented reality gears may be used, such as the headset, microphone, gesture sensors, motion trackers, game controllers, etc., to receive game play input from the game players. In an example, Returning to 784, the processor may receive vehicle state, such as the velocity, direction, acceleration, road condition, weather, etc. during the game play as the vehicles travel, and at 786, the processor may generate, output, and maintain alternative reality objects and environment, such as the simulated motion and environment of the flying unicorns concomitant with the motion of the vehicles using equipment such as 4D chairs inside the vehicle, the fire breaths of the evil dragons as simulated by the audio visual output of the dragon breaths outputted from the virtual/augmented reality gears such as surround screens and speakers, and increased cabin temperature to simulate heat, etc. Once the destination is reached at 794 (e.g., a point on Mullholand Drive designated as the finish line), the processor proceeds to calculate the scores of the players and terminate the session. For example, Ben is a seasoned "dragon slayer," and during the game session with Ed, Ben has killed five black dragons, and one each of the red, green, and blue dragons. Ed, on the other hand, has not killed any dragons except one blue. In such case, the processor awards 11 points to Ben, and 1 point to Ed. Ben is the winner, and Ben is awarded with an alternative reality output of a princess thanking and kissing Ben for being a hero.

Referring again to FIG. 7A at 712, after selecting or configuring the media program the processor provides the media program to the media player of each user in the group of identified users. In an aspect, the processor may play the media program. For example, the processor may stream the media program or provide it as a digital download over one or more networks shown in FIG. 1. Or it may provide the media program from a local storage in each participating vehicle. If playing the media program, the processor may execute operations as described in connection with FIGS. 7B-D above. In another alternative, the processor may select each participating client device based in part on the device having local access to the media program, or remote access from an independent source, in which case the operation 712 may be omitted.

While operations 701-712 relate to initiating an inter-vehicular session of media play, further novel aspects of the present disclosure relate to aspects of inter-vehicular game play or game setup, for execution by a computer processor. FIGS. 8B-8G show additional operations 822-876 that may optionally be included in the method 800 and performed by one or more processors performing the method 800, in any operative order. Any one or more of the additional operations 822-876 may be omitted unless needed by a downstream operation and one or more of the operations 822-876 may replace one or more others of the operations of the method 800. Any useful combination of operations selected from the group consisting of the operations 822-876 may be performed by one or more processors of an apparatus as described herein as an independent method distinct from other useful combinations selected from the same group.

Referring to FIG. 8B, the method 800 may further include at 822 identifying, by one or more processors, the group of users based on profile data of each user. The profile data may comprise at least one of present preference data, past preference data, and trip purpose for each of the users.

At 824, the method may further include identifying, by one or more processors, the group of users based on trip data for each of the vehicle carrying the group of users. In an aspect, the trip data may indicate that the users have substantially similar trip start times, durations, intermediate locations along a route or end times. The trip data may indicate that the users have substantially similar trip itineraries, or substantially similar trip purposes. Trips may be contemporaneous, asynchronous and overlapping in time or space, or asynchronous and nonoverlapping in time or space but related by another similarity parameter.

At 826, the method may further include selecting, by one or more processors, the two or more vehicles based on profile data of each user in the group. In an aspect, the user profile may indicate preference for certain type of vehicle. In an aspect, a preference in the user profile may require certain type of vehicle, for example, a preference for xR games may require vehicles with xR components. In an aspect, the two or more vehicles may include similar theme configuration or decoration.

In an aspect, at 828, the method may divide the group of users into teams based on which of the two or more vehicles each of the users occupies. The teams may comprise users of the group in multiple vehicles.

In an aspect, the method may maintain time and space information of the vehicles carrying the group of users. The method may allow users to trade this information. For example, the information may indicate that a vehicle is a lead vehicle in the group or caravan. The method may allow users in different vehicles to see what is not presently visible. For example, users in non-leading vehicles may be able to see, hear or smell what is still around the corner but is already seen and heard at the lead vehicle. Another example may allow users of leading vehicles to see, hear or smell what is presently sensible in a vehicle at the tail of the group of vehicles. In an aspect, the method may dynamically use this information in a game in real-time. For example, a user in a lead vehicle may inform or bluff other users in other vehicles of real or non-real presence of an object ahead of the group of vehicles. In an aspect, the method may enable users to drop or pick up objects along the route in an xR-based game. Either a user, cameras or sensors can report time, space, fields of view and sensory information to identify objects exchanged. The vehicles may be geographically local to one another, or geographically distant from one another.

Referring to FIG. 8C, the method 800 may further include at 832 one of selecting, configuring or creating, by one or more processors, media program which is indicated as ready for play. In an aspect, at 834, the one or more processors may select, configure or create the media program based in part on user profile of each user. In an aspect, at 836, the one or more processors may select, configure or create the media program based in part on trip data of the two or more vehicles. In another aspect, at 838, the one or more processors may select, configure or create the media program based on one or more criteria, at least in part by an algorithm that evaluates relationships between user-facing elements of the media program and one or more of: the initial location, the terminal location and the one or more intermediate locations.

In an aspect (not shown), the one or more processors may select, configure or create the media program based in part on weather conditions at the two or more vehicles.

Referring to FIG. 8D, the method 800 may further include at 842 processing, by one or more processors, involuntary biometric sensor data indicating a transient neurological state of each user relating to each user's current or past preferences. In an aspect, at 844, the one or more processors may select, configure or create the media program based on at least one of input, past preference data, and involuntary biometric sensor data.

Figure 8E:
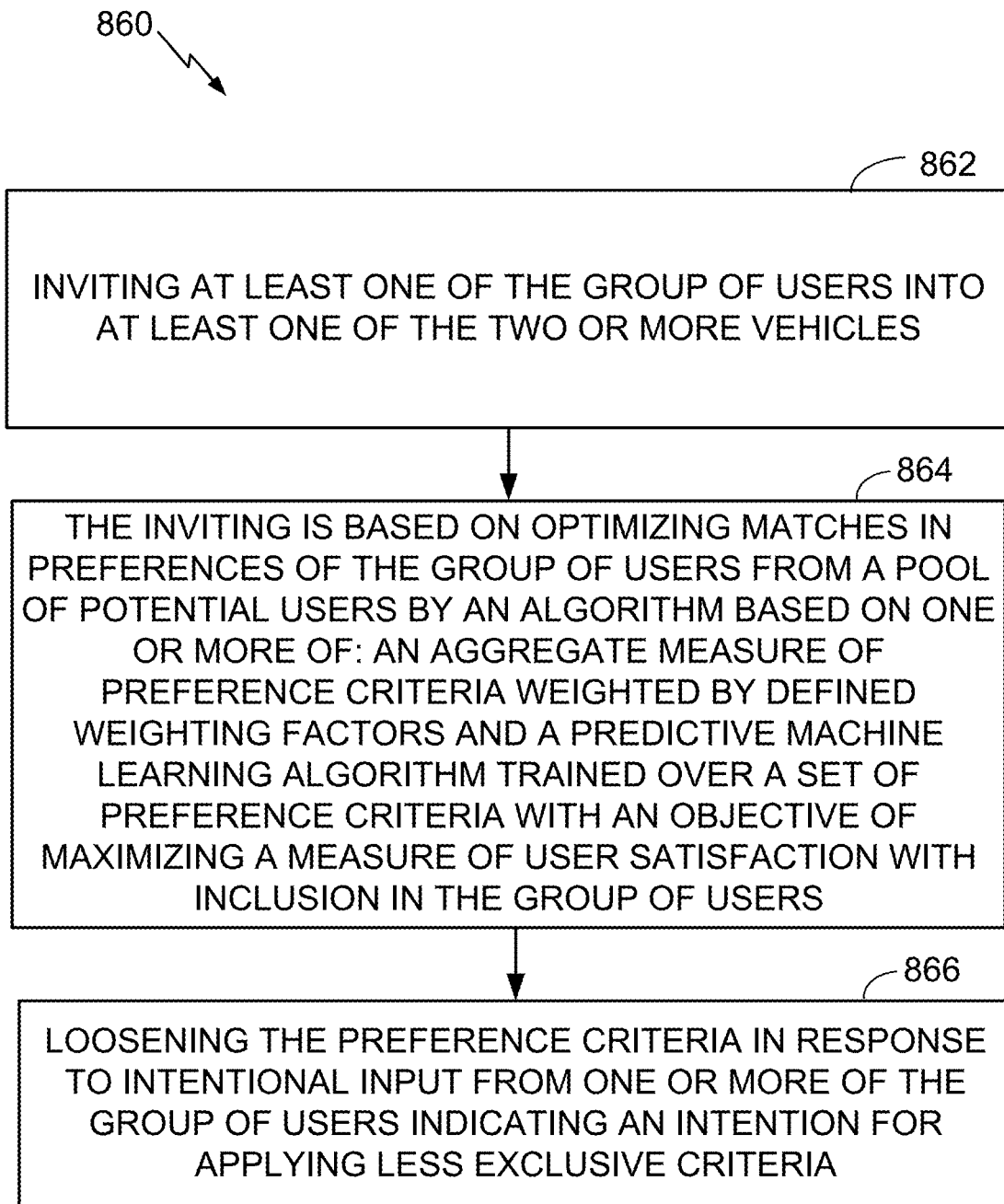

Referring to FIG. 8E, the method 800 may further include at 852 providing, by one or more processors, trip data for each of the two or more vehicles for use in play of the media program. In an aspect, at 854, the one or more processors may select routes of the two or more vehicles based in part on congestion management criteria, and in part on entertainment objectives of the media program. The congestion management criteria may be predetermined or updated dynamically. In an aspect, the routes may be preset. In another aspect, at 856, the one or more processors may control navigation of at least one of the two or more vehicles to facilitate use of the media program by the group of users. At 858, the controlling the navigation of the vehicles may include parking the two or more vehicles for a stationary session.

Figure 8F:
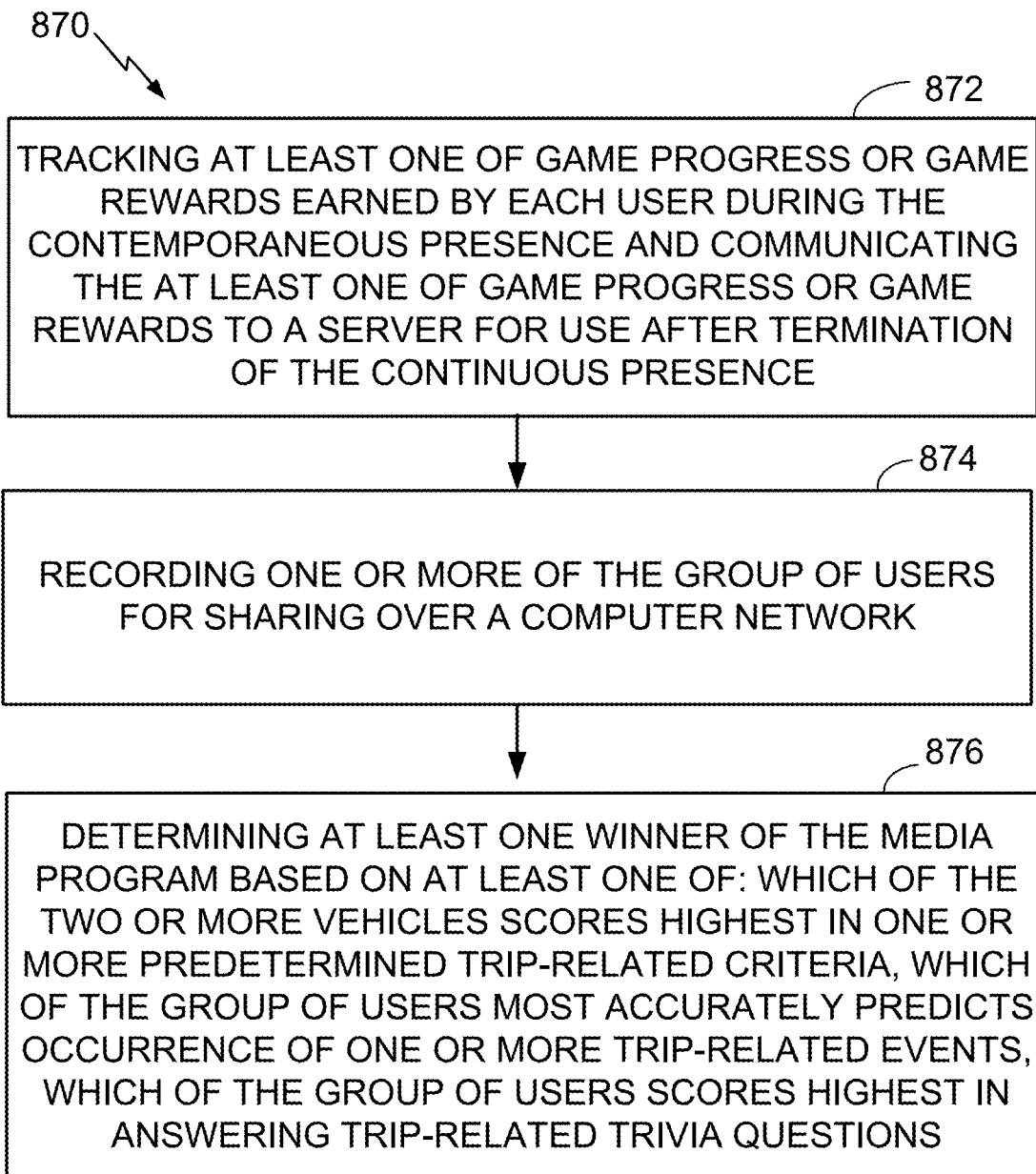

Referring to FIG. 8F, the method 800 may further include at 862 inviting, by one or more processors, at least one of the group of users into at least one of the two or more vehicles. The one or more processors may invite the users via one of suitable methods of messaging. At 864, the one or more processors may invite the users based on optimizing matches in preferences of the group of users from a pool of potential users by an algorithm based on one or more of: an aggregate measure of preference criteria weighted by defined weighting factors and a predictive machine learning algorithm trained over a set of preference criteria with an objective of maximizing a measure of user satisfaction with inclusion in the group of users. In an aspect, at 866, the one or more processors may loosen the preference criteria in response to intentional input from one or more of the group of users indicating an intention for applying less exclusive criteria.

Referring to FIG. 8G, the method 800 may further include at 872 tracking, by one or more processors, at least one of game progress or game rewards earned by each user during the contemporaneous presence and communicating the at least one of game progress or game rewards to a server for use after termination of the continuous presence. In an aspect, the method may allow users to share game rewards or credits. At 874, the one or more processors may record one or more of the group of users for sharing over a computer network, for example, over a social media network. In an aspect, an artificial intelligence (AI) engine may receive the recorded data for training learning machines. In an aspect, the AI engine may assist in selecting, configuring or creating the media programs, or in assisting users in playing the media programs.

In an aspect, at 876, the one or more processors may determine at least one winner of the media program based on at least one of: which of the two or more vehicles scores highest in one or more predetermined trip-related criteria, which of the group of users most accurately predicts occurrence of one or more trip-related events, which of the group of users scores highest in answering trip-related trivia questions, and the like.

FIG. 9 is a conceptual block diagram illustrating components of an apparatus or system 900 for providing electronics games for play by a group of users in two or more moving vehicles as described herein, according to one embodiment. As depicted, the apparatus or system 900 may include functional blocks that can represent functions implemented by a processor, software, or combination thereof (e.g., firmware).

As illustrated in FIG. 9, the apparatus or system 900 may comprise an electrical component 902 for maintaining a data structure of media program data, user profile data, and vehicle profile data in one or more databases. The component 902 may be, or may include, a means for said maintaining. Said means may include the processor 920 coupled to the memory 924, storage 926 which may store the one or more databases, and to the network interface 922, the processor executing an algorithm based on program instructions stored in the memory. Such algorithm may include a sequence of more detailed operations, for example, receiving media program data, user profile data and vehicle data; generating or receiving metadata for the received data; indexing the received data and the generated data, and storing the received data and the metadata in a data structure. Further aspects of such algorithm may be described as above, for example, in connection with block 702 of FIG. 7A above.

The apparatus or system 900 may further comprise an electrical component 904 for receiving and/or determining user presence. The component 904 may be, or may include, a means for said receiving and determining. Said means may include the processor 920 coupled to the memory 924, storage 926, and to the network interface 922, the processor executing an algorithm based on program instructions stored in the memory. Such algorithm may include a sequence of more detailed operations, for example, receiving signals from two or more client devices; determining geographic locations of the client devices based at least in part on the signals; receiving signals from one or more vehicles and determining geographic locations of the vehicles; comparing the geographic locations of the vehicles and client devices, and determining whether the client devices are present in different vehicles at the same or different times based on the comparison. In an alternative, a processor may infer contemporaneous presence in two or more vehicles based on movement of the client devices. In another alternative, the processor may connect with the client devices via a wireless node known to be located in a vehicle, and thus may conclude that each of the users are present in two or more vehicle when an initial connection is made to via the two or more vehicles. Further aspects of such algorithm may be described as above, for example, in connection with block 704 of FIG. 7A above.

The apparatus or system 900 may further comprise an electrical component 906 for receiving and/or determining vehicle state. The component 906 may be, or may include, a means for said receiving and determining. Said means may include the processor 920 coupled to the memory 924, storage 926, and to the network interface 922, the processor executing an algorithm based on program instructions stored in the memory. In an aspect, the information may be received from external systems via the network interface 922. Such algorithm may include a sequence of more detailed operations, for example, in an aspect, receiving or determining user presence from GPS-based applications located in a user or player device. In another aspect, the sequence of operations may include receiving or determining user presence from GPS-based applications and components that are part of, or connected to, a vehicle controller (VC). In another aspect, the receiving or determining of user presence may be done from non-GPS-based applications located in a vehicle. Further aspects of such algorithm may be described as above, for example, in connection with block 706 of FIG. 7A above.

The apparatus or system 900 may further comprise an electrical component 908 for identifying a group of users based on at least one of: contemporaneous presence in two or more vehicles or common participation in a game or other group experience for related trips at different times. The component 908 may be, or may include, a means for said identifying. Said means may include the processor 920 coupled to the memory 924, storage 926, and to the network interface 922, the processor executing an algorithm based on program instructions stored in the memory. Such algorithm may include a sequence of more detailed operations, for example, based on similar user profiles, destinations, preferences or interests. In an alternative, or in addition, the processor may select the group of users based on express indications of user interest. Further aspects of such algorithm may be described as above, for example, in connection with block 708 of FIG. 7A above.

The apparatus or system 900 may further comprise an electrical component 910 for selecting, configuring or creating media programs. The component 908 may be, or may include, a means for said selecting, configuring or creating. Said means may include the processor 920 coupled to the memory 924, storage 926, and to the network interface 922, the processor executing an algorithm based on program instructions stored in the memory. Such algorithm may include a sequence of more detailed operations, for example, in an aspect, the processor selects, configures or creates the media program based at least in part on data from the user profiles of the identified users and/or in part on data from the corresponding vehicle profiles. In an aspect, the processor selects, configures or creates the media program based in part on the specifications of the media player at each vehicle. Further aspects of such algorithm may be described as above, for example, in connection with block 710 of FIG. 7A above.

The apparatus or system 900 may further comprise an electrical component 912 for providing one or more media programs to one or more media players. The component 908 may be, or may include, a means for said providing. Said means may include the processor 920 coupled to the memory 924, storage 926, and to the network interface 922, the processor executing an algorithm based on program instructions stored in the memory. Such algorithm may include a sequence of more detailed operations, for example, the processor may stream the media program or provide it as a digital download over one or more networks shown in FIG. 1. Or, it may provide the media program from a local storage in each participating vehicle. Further aspects of such algorithm may be described as above, for example, in connection with block 712 of FIG. 7A above.

As shown, the apparatus or system 900 may include a processor component 920 having one or more processors, which may include a digital signal processor. The processor 920, in such case, may be in operative communication with the modules 902-910 via a bus 930 or other communication coupling, for example, a network. The processor 920 may initiate and schedule the functions performed by electrical components 902-912.

In related aspects, the apparatus or system 900 may include a network interface module 922 operable for communicating with any external storage device, with external systems or servers, or connected vehicles over a computer network. In further related aspects, the apparatus or system 900 may optionally include a module for storing information, such as, for example, a memory device/module 924. The computer readable medium or the memory module 924 may be operatively coupled to the other components of the apparatus 900 via the bus 930 or the like. The memory module 924 may be adapted to store computer readable instructions and data for effecting the processes and behavior of the modules 902-912, and subcomponents thereof, or the processor 920, or one or more steps of the method 700. The memory module 924 may retain instructions for executing functions associated with the modules 902-912. While shown as being external to the memory 924, it is to be understood that the modules 902-912 can exist within the memory 924.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), televisions, digital projectors, smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device (PLD) or complex PLD (CPLD), discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other format). Of course, those skilled in the art will recognize many modifications may be made to this configuration without departing from the scope of the disclosed aspects. Thus, the system methods described herein may be embodied in any computer-readable medium for use by or in connection with an instruction execution system, apparatus, or device, such as a computer-based system, processor-containing system, or other system that fetches the instruction execution system, apparatus or device, and execute the instructions. A computer-readable medium may be any device or apparatus that stores, communicates, propagates, or transports a program for use by or in connection with the instruction execution system, apparatus, or device. For example, non-transitory computer-readable medium may be an electronic, magnetic, optical, electromagnetic, infrared, or semiconductor system, apparatus, device, or other storage medium known in the art or yet to be developed.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. For example, process descriptions or blocks in flowcharts and block diagrams presented herein may be understood to represent modules, segments, or portions of code or logic, which include one or more executable instructions for implementing specific logical functions or steps in the associated process. Alternative implementations are included within the scope of the present disclosure in which functions may be executed out of order from the order shown or described herein, including substantially concurrently or in reverse order, depending on the functionality involved, as would be understood by those reasonable skilled in the art after having become familiar with the teachings of the present disclosure. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A computer-implemented method of providing electronic media for a set of users, the method comprising:
    identifying, by one or more processors, a group of users, based on:

a presence, for a period of time, by each user in the group of users, each user representing a respective independently controlled vehicle, an indication of interest by each user in a communication network-mediated interaction with another of the group of users during the period of time, and trip data for each of the vehicles, wherein the trip data comprises one or more locations associated with an interactive media session for execution by interactive media players, each interactive media player associated with a respective user of the group of users;

selecting or configuring, by the one or more processors and based on the trip data for each of the vehicles and the locations, an interactive media program for execution by the interactive media players; and providing, by the one or more processors, the interactive media program to the interactive media players during the period of time.

2. The computer-implemented method of claim 1, wherein identifying the group of users is based on profile data for each user, wherein the profile data comprises a respective account identifier for the respective user, and wherein the selecting or configuring is based on an indication, by one or more electronic accounts identified by the account identifiers, that the interactive media program is ready to play.

3. The computer-implemented method of claim 1, wherein the trip data indicates two or more users having substantially similar trip start times, durations, intermediate locations along a route, or end times.

4. The computer-implemented method of claim 1, wherein the trip data defines one or more criteria selected from the group consisting of: a duration for the interactive media session, an initial location at which the session is initiated, and a terminal location at which the session is terminated.

5. The computer-implemented method of claim 1, further comprising, by the one or more processors, defining one or more routes for the vehicles based in part on the interactive media program, and controlling navigation of at least one of the vehicles to facilitate use of the interactive media program by the group of users.

6. The computer-implemented method of claim 1, further comprising playing, by at least one of the interactive media players, the interactive media during the time period.

7. The computer-implemented method of claim 1, wherein the selecting or configuring further comprises serving a user interface to each of sthe interactive media players in each of the vehicles that enables one or more of the users to provide intentional input to the selecting by the one or more processors.

8. A system comprising:
a processor; and
a non-transitory computer readable medium having program instructions stored thereon, which, when executed by the processor, cause the system to perform operations comprising:
identifying, by the processor, a group of users, based on:
a presence, for a period of time, by each user in the group of users, each user representing a respective independently controlled vehicle,
an indication of interest by each user in a communication network-mediated interaction with another of the group of users during the period of time, and
trip data for each of the vehicles, wherein the trip data comprises one or more locations associated with an interactive media session for execution by interactive media players, each interactive media player associated with a respective user of the group of users;

selecting or configuring, by the processor and based on the trip data for each of the vehicles and the locations, an interactive media program for execution by the interactive media players; and providing, by the processor, the interactive media program to the interactive media players during the period of time.

9. The system of claim 8, wherein identifying the group of users is based on profile data for each user, wherein the profile data comprises a respective account identifier for the respective user, and wherein the selecting or configuring is based on an indication, by one or more electronic accounts identified by the account identifiers, that the interactive media program is ready to play.

10. The system of claim 8, wherein the trip data indicates two or more users having substantially similar trip start times, durations, intermediate locations along a route, or end times.

11. The system of claim 8, wherein the trip data defines one or more criteria selected from the group consisting of: a duration for the interactive media session, an initial location at which the session is initiated, and a terminal location at which the session is terminated.

12. The system of claim 8, wherein when executed by the processor, the program instructions cause the system to perform operations comprising defining one or more routes for the vehicles based in part on the interactive media program, and controlling navigation of at least one of the vehicles to facilitate use of the interactive media program by the group of users.

13. The system of claim 8, wherein when executed by the processor, the program instructions cause the system to perform operations comprising playing, by at least one of the interactive media players, the interactive media during the time period.

14. The system of claim 8, wherein the selecting or configuring further comprises serving a user interface to the at least one of the interactive media players in each of the vehicles that enables one or more of the users to provide intentional input to the selecting by the one or more processors.

15. A non-transitory computer readable medium configured to store processor-readable instructions, wherein when executed by a processor, the instructions perform operations comprising:
identifying, by one or more processors, a group of users, based on:
a presence, for a period of time, by each user in the group of users, each user representing a respective independently controlled vehicle,
an indication of interest by each user in a communication network-mediated interaction with another of the group of users during the period of time, and
trip data for each of the vehicles, wherein the trip data comprises one or more locations associated with an interactive media session for execution by interactive media players, each interactive media player associated with a respective user of the group of users;

selecting or configuring, by the one or more processors and based on the trip data for each of the vehicles and the locations, an interactive media program for execution by the interactive media players; and providing, by the one or more processors, the interactive media program to the interactive media players during the period of time.

16. The non-transitory computer readable medium of claim 15, wherein identifying the group of users is based on profile data for each user, wherein the profile data comprises a respective account identifier for the respective user, and wherein the selecting or configuring is based on an indication, by one or more electronic accounts identified by the account identifiers, that the interactive media program is ready to play.

17. The non-transitory computer readable medium of claim 15, wherein the trip data indicates two or more users having substantially similar trip start times, durations, intermediate locations along a route, or end times.

18. The non-transitory computer readable medium of claim 15, wherein the trip data defines one or more criteria selected from the group consisting of: a duration for the interactive media session, an initial location at which the session is initiated, and a terminal location at which the session is terminated.

19. The non-transitory computer readable medium of claim 15, wherein when executed by the one or more processors, the instructions perform further operations comprising determining one or more routes for the vehicles based in part on the interactive media program, and controlling navigation of at least one of the vehicles to facilitate use of the interactive media program by the group of users.

20. The non-transitory computer readable medium of claim 15, wherein when executed by the one or more processors, the instructions perform further operations comprising playing, by at least one of the interactive media players, the interactive media during the time period.

21. The non-transitory computer readable medium of claim 15, wherein the one of selecting or configuring further comprises serving a user interface to the at least one of the interactive media players in each of the vehicles that enables one or more of the users to provide intentional input to the selecting by the one or more processors.

* * * * *

UNITED STATES PATENT AND TRADEMARK OFFICE
CERTIFICATE OF CORRECTION

PATENT NO. : 12,324,986 B2
APPLICATION NO. : 18/436827
DATED : June 10, 2025
INVENTOR(S) : Gary Lake-Schaal et al.

Page 1 of 1

It is certified that error appears in the above-identified patent and that said Letters Patent is hereby corrected as shown below:

In the Claims

In Column 33, Line 49, delete "sthe" and insert --the--

Signed and Sealed this
Twenty-second Day of July, 2025

Coke Morgan Stewart
*Acting Director of the United States Patent and Trademark Office*